United States Patent
Letourneau

(10) Patent No.: US 11,907,326 B1
(45) Date of Patent: *Feb. 20, 2024

(54) SYSTEMS AND METHOD FOR DETERMINING FREQUENCY COEFFICIENTS OF SIGNALS

(71) Applicant: QUALCOMM TECHNOLOGIES, INC., San Diego, CA (US)

(72) Inventor: Pierre-David Letourneau, Long Island, NY (US)

(73) Assignee: QUALCOMM Incorporated, San Diego, CA (US)

(*) Notice: Subject to any disclaimer, the term of this patent is extended or adjusted under 35 U.S.C. 154(b) by 128 days.

This patent is subject to a terminal disclaimer.

(21) Appl. No.: 17/559,475

(22) Filed: Dec. 22, 2021

Related U.S. Application Data

(63) Continuation of application No. 15/415,368, filed on Jan. 25, 2017, now Pat. No. 11,250,103.

(60) Provisional application No. 62/286,732, filed on Jan. 25, 2016.

(51) Int. Cl.
  *G06F 17/14* (2006.01)
(52) U.S. Cl.
  CPC .................. *G06F 17/142* (2013.01)
(58) Field of Classification Search
  CPC .......................................... G06F 17/142
  See application file for complete search history.

(56) References Cited

U.S. PATENT DOCUMENTS

| | | | |
|---|---|---|---|
| 4,106,103 A | 8/1978 | Perreault | |
| 8,836,557 B2 | 9/2014 | Eldar et al. | |
| 11,250,103 B1 | 2/2022 | Letourneau | |
| 2004/0162866 A1 | 8/2004 | Malvar | |
| 2009/0216137 A1 | 8/2009 | Holland | |
| 2010/0177906 A1 | 7/2010 | Vetterli et al. | |
| 2015/0146826 A1 | 5/2015 | Katabi et al. | |

FOREIGN PATENT DOCUMENTS

EP  1764705 A2 * 3/2007 ........... G06F 17/141

OTHER PUBLICATIONS

Ghazi B., et al., "Sample-Optimal Average-Case Sparse Fourier Transform in Two Dimensions", IEEE, 51st Annual Allerton Conference on Communication, Control, and Computing (Allerton), 2013, pp. 1258-1265.

(Continued)

*Primary Examiner* — Michael D. Yaary
(74) *Attorney, Agent, or Firm* — Seyfarth Shaw LLP

(57) ABSTRACT

A system for determining the frequency coefficients of a one or multi-dimensional signal that is sparse in the frequency domain includes determining the locations of the non-zero frequency coefficients, and then determining values of the coefficients using the determined locations. If N is total number of frequency coefficients across the one or more dimension of the signal, and if R is an upper bound of the number of non-zero ones of these frequency coefficients, the systems requires up to (O(Rlog(R) (N))) samples and has a computation complexity of up to O(Rlog$^2$(R) log (N)). The system and the processing technique are stable to low-level noise and can exhibit only a small probability of failure. The frequency coefficients can be real and positive or they can be complex numbers.

14 Claims, 6 Drawing Sheets

(56) References Cited

OTHER PUBLICATIONS

Hassanieh H., et al., "Simple and Practical Algorithm for Sparse Fourier Transform", in Proceedings of the twenty-third annual ACM-SIAM Symposium on Discrete Algorithms, SIAM (2012), pp. 1183-1194.

Hassanieh H., et al., "Nearly Optimal Sparse Fourier Transform", in Proceedings of the forty-fourth annual ACM symposium on Theory of computing, ACM (2012), pp. 563-578.

Hoeffding W, "Probability Inequalities for Sums of Bounded Random Variables", Journal of the American Statistical Association, 1962, vol. 58, No. 301, pp. 13-30.

Indyk P., et al., "(Nearly) Sample-Optimal Sparse Fourier Transform", in Proceedings of the Twenty-Fifth Annual ACM-SIAM Symposium on Discrete Algorithms, SIAM Oct. 2013, pp. 480-499.

Indyk P., et al., "Sparse Fourier Transform in Any Constant Dimension with Nearly-Optimal Sample Complexity in Sublinear Time", in Proceedings of the forty-eighth annual ACM symposium on Theory of Computing (STOC '16), ACM 2014, pp. 264-277.

\* cited by examiner

| References | Time | Samples | C(p) | C(d) | Type | Model |
|---|---|---|---|---|---|---|
| [20] | $O(R\log^2(N))$ | $O(R\log(N))$ | $p^{-2}$ | 1D | approx. | worst |
| [18] | $O(N\log^3(N))$ | $O(R\log(N))$ | $\sim N^{-O(R)}$ | $d^3$ | approx. | worst |
| [12] | $O(R\log^2(N))$ | $O(R\log(N))$ | expected | 1D, 2D | approx. | average |
| [13] | $O(R^2\log^{2O(d)}(N))$ | $O(R\log^{O(d)}(N))$ | $\log(p^{-1})$ | $2^{O(d)}$ | approx. | worst |
| [14] | $O(R\log^{O(d)}(N))$ | $O(R\log^{O(d)}(N))$ | $\log(p^{-1})$ | $2^{O(d)}$ | approx. | worst |
| [21] | $O(R\log(R)\log^2(N))$ | $O(R\log^2(N))$ | $\log(p^{-1})$ | 1D | approx. | worst |
| [23] | $O(R\log^{d+3}(N))$ | $\tilde{O}(R\log(N))$ | $\sim \frac{1}{\log N}$ | $2^{O(d)}$ | exact | worst |
| [16] | $O(R\log(N))$ | $O(R\log(N))$ | constant | 1D | exact | average |
| [21] | $\tilde{O}(R^2\log^4(N))$ | $\tilde{O}\left(R^2\frac{\log^4(N)}{\log\log(N)}\right)$ | deterministic | 1D | exact | worst |
| [29] | $O(R\log^4(N))$ | $O(R\log^2(N))$ | $\sim \frac{1}{R\log^2(N)}$ | 2D | noisy | worst |
| [25] | $O(R\log(R))$ | $O(R)$ | deterministic | 1D | noisy | average |
| [12] | $O(R\log(R))$ | $O(R)$ | constant | 1D, 2D | noisy | average |
| This paper | $\tilde{O}(R\log^2(R)\log(N))$ | $\tilde{O}(R\log(R)\log(N))$ | $\log(p^{-1})$ | $O(1)$ | noisy | worst |

Table 1: Computational characteristics of recent sparse FFT algorithms. C(d): behavior of algorithmic constant with respect to dimension d. C(p): behavior of algorithmic constant with respect to probability of failure p. $\sim$ indicates the dependence of the probability of failure on other parameters. "exact" implies the exactly R-sparse FFT problem without any noise whereas "noisy" implies the presence of low-level noise only.

Algorithm 1 HDSFFT(R, N, p)

1: Let $\mu$, $\Delta$ and $\eta$ be estimates for $\min_{j \in S} |\hat{f}_j|$, $\frac{|\hat{f}_j|}{\mu}$ and the noise $\sqrt{N} \|\hat{\rho}\|_2$ respectively.
2: (In the noiseless case, let $\eta$ be the desired level of accuracy)
3: $S \leftarrow$ FIND_SUPPORT(R, N, p, $\mu$, $\Delta$, $\eta$)
4: $\hat{f} \leftarrow$ COMPUTE_VALUES(S, R, N, p, $\mu$, $\Delta$, $\eta$)
5: Output: $\hat{f}$, S.

FIG. 2

$$S_p^{shuffled} = \{(1 \cdot 13) \bmod 40, (23 \cdot 13) \bmod 40, (35 \cdot 13) \bmod 40\} = \{13, 15, 19\}$$
$$M_p^{shuffled} = \{(1 \cdot 13) \bmod 40, (3 \cdot 13) \bmod 40, (15 \cdot 13) \bmod 40, (21 \cdot 13) \bmod 40, (23 \cdot 13) \bmod 40, (35 \cdot 13) \bmod 40\}$$
$$= \{13, 15, 19, 33, 35, 39\}$$

Table 2: Values of parameters required by Algorithm 1-4 and used for numerical experiments

| Parameter | Description | Value (Case 1) | Value (Case 2) |
|---|---|---|---|
| $N$ | Total number of unknowns | variable | $10^8$ |
| $R$ | Number of nonzero frequencies | 50 | variable |
| $\alpha$ | Gaussian filter parameter | 0.15 | 0.15 |
| $\delta$ | Statistical test parameter | 0.1 | 0.1 |
| $p$ | Probability of failure | $10^{-4}$ | $10^{-4}$ |
| $d$ | Ambient dimension | 3 | 3 |
| $\eta$ | Noise level | $10^{-2}$ | $10^{-2}$ |

FIG. 10

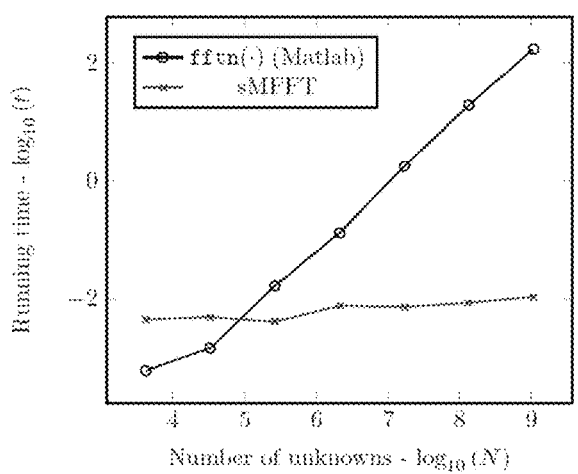

FIG. 11A

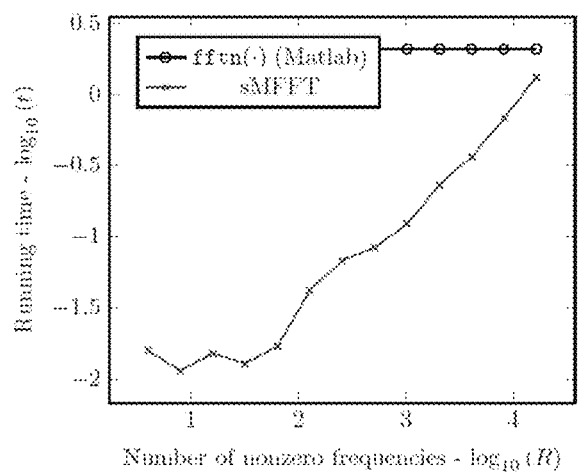

FIG. 11B

SYSTEMS AND METHOD FOR DETERMINING FREQUENCY COEFFICIENTS OF SIGNALS

CROSS-REFERENCE TO RELATED PATENT APPLICATIONS

This application is a Continuation of U.S. patent application Ser. No. 15/415,368 entitled "Systems and Method for Determining Frequency Coefficients of Signals," filed on Jan. 25, 2017 which claims benefit of priority to U.S. Provisional Patent Application Ser. No. 62/286,732 entitled "Sparse Multidimensional Fast Fourier Transform (sMFFT)," filed on Jan. 25, 2016, the contents of which are incorporated herein by reference in their entirety.

GOVERNMENT LICENSE RIGHTS

This invention was made with Government support under contract number HR0011-12-C-0123 awarded by the Defense Advanced Research Projects Agency (DARPA). The Government has certain rights in the invention.

FIELD OF THE INVENTION

This disclosure generally relates to signal processing and, in particular, to determination of a spectrum, i.e., frequency components, of a signal that is sparse in the frequency domain.

BACKGROUND

The Fast Fourier Transform (FFT) computation reduces the computational cost of computing the Discrete Fourier Transform (DFT) of a general complex N-vector from $O(N^2)$ to $O(N \log(/V))$. The general complex N-vector may include N discrete values of a signal, such as a signal received from a sensor such as a radar, and infra-red sensor, etc., a signal received from or transmitted using an antenna, etc. Since its popularization in the 1960s, the FFT algorithm has played a crucial role in multiple areas including scientific computing, signal processing, and computer science. In the general case, such scaling from $O(N^2)$ to $O(N \log(/V))$ is at most a factor $\log(N)$ from optimality. In more restricted cases however, such as when the signal/vector to be recovered is sparse, it is possible, at least in theory, to significantly improve on the latter.

Indeed, the past decade or so has seen the design and study of various algorithms that can compute the DFT of sparse vectors using significantly less time and measurements than those required by a traditional FFT. That is, if f is an Nx1 vector corresponding to the DFT of an Nx1 vector f containing at most R N nonzero elements, it is possible to recover f using significantly fewer samples than the traditional "Nyquist rate" ($O(N)$) and in computational complexity much lower than that of the FFT ($O(N \log(N))$). These schemes are generally referred to as "sparse Fast Fourier Transform" (sFFT) algorithms, and they generally fall within two categories: 1) deterministic versus randomized algorithms, and 2) exactly sparse versus approximately sparse algorithms.

In general, for a periodic signal, $$f(x) = \sum_{j=0}^{n-1} e^{-2\pi i x j}(\hat{f}_j + \eta \hat{v}_j), \quad (1)$$

we say that the signal is R-sparse if the support of the spectrum $\hat{f}$, i.e., the set of indices for which a frequency component (also called frequency coefficient) $\hat{f}_j$ is "non-zero," has cardinality smaller than or equal to R. Equation (1) describes a time-domain signal f(x) in terms of its frequency coefficients f and, as such, may be referred to as inverse DFT. According to one convention, the sign of the exponent representing an inverse DFT or inverse FFT is positive.

Recovery of the location and magnitude of the nonzero coefficients is referred to as the exactly R-sparse FFT problem if n=0 and as the noisy R-sparse FFT problem if 0<n is relatively small. The value of a frequency coefficient is considered to be "zero" if the absolute value is less than or equal to a specified small number, such as 0.0002, 0.1, 0.6, 1, 1.5, 3, etc. Frequency coefficients having a value greater than or equal to a specified threshold are called "non-zero" coefficients. When the signal is not R-sparse but nonetheless compressible, the problem of finding the best R-sparse approximation is referred to as the approximately sparse FFT problem and takes the following form: Given an accuracy parameter e, find f * such that, $$\|\hat{f}^* - \hat{f}\|_a \le (1+\varepsilon) \min_{\hat{y}: R\text{-}sparse} \|\hat{y} - \hat{f}\|_b + \eta \|\hat{f}\|_c \quad (2)$$

where $\|\cdot\|_a$, $\|\cdot\|_b$ and $\|\cdot\|_c$ are $\ell_p$ norms (generally p=1 or 2).

Of the former category, randomized algorithms have had the most success in practice thus far; although some deterministic algorithms do exhibit quasilinear complexity in R and polylogarithmic complexity in N, the algorithmic constant and the exponents are often so large that the methods are only competitive when N is impractically large or when the sparsity satisfies stringent conditions. On the other hand, both the algorithmic constant and the complexity of randomized sparse FFTs are in general much smaller. The most recent results on the topic are shown in Table 1 in FIG. 1.

Among approximate sparse FFT algorithms, some randomized techniques have achieved the best complexities in the average and worst-case scenarios. They use different techniques to locate the support of the important frequencies, such as orthogonal frequency division multiplexing (OFDM) where the problem is "lifted" from 1D to 2D and sparsity along each column/row is leveraged. Another technique uses binning techniques (shifting, shuffling and filtering) to produce a support-locating estimator. These techniques ultimately rely in general on estimating some complex phase containing information with regard to the support of the signal.

Among exact sparse FFT algorithms, one technique achieved the best complexities in the worst case, and a deterministic technique and a randomized technique with constant probability of success achieved the best complexity in the average case. We note however that these techniques can be very unstable, even to low-level noise, being based upon the Chinese Remainder Theorem. The performance of the other technique can degrade significantly when a worst case scenario is considered. In addition, to achieve such low complexity, one technique makes use of adaptive sampling, where samples for a subsequent iterations are chosen based on information available at the current iteration. These results show an interesting trade-off: in an R-sparse worst-case scenario, algorithms exhibiting the best sampling/computational complexity often possess scaling much inferior than their counter-part per regards to the probability of failure p, and vice-versa. Such characteristics can be detrimental in settings where high-performance is needed and failure cannot be tolerated. Finally, we also observe from Table 1 that whenever the algorithm is generalizable to multiple dimensions, the algorithmic constant exhibits a scaling which is at least exponential in the dimension d.

SUMMARY

Various techniques are described for treating a noisy R-sparse FFT problem when the spectrum f is nonnegative. Various embodiments or implementations for determining the spectrum f of a signal f(x), i.e., the frequency coefficients of the signal f(x), exhibit a low sampling complexity of $\tilde{O}(R\log(R)\log(N))$ and a low computational complexity of $\tilde{O}(R\log^2(R)\log(N))$ (where $\tilde{O}$ indicates the presence of $\log^c(\log(\cdot))$ factors), and further scales according to log(p) with respect to the probability of failure p, thus alleviating the issues underlined above. In addition, various embodiments can perform with constant scaling with respect to more than one dimensions, i.e., in d dimensions with $N=M^d$ unknowns, the scaling is of the form log(N)=d log(M) without further dependence. In this context, a low sampling complexity may mean $1/10^{th}$, $1/25^{th}$, $1/100^{th}$, $1/1000^{th}$ etc., of the traditional O(N) Nyquist-rate samples, or even fewer samples. N can also be the total number of frequency coefficients of the signal f(x). Similarly, a low computational complexity may mean requiring $1/10^{th}$, $1/25^{th}$, $1/100^{th}$, $1/1000^{th}$ etc., of the number of arithmetic and/or data-access operations that are required in a traditional FFT computation or in other sFFT computations. The algorithm is also non-adaptive. Therefore, sampling and computations can be interleaved, but this is not necessary. The required sampling can be performed in a data-collection phase, and the sets of signal samples can be used subsequently to determine the frequency coefficients of the signal.

Various embodiments use techniques such as shuffling and filtering. However, our support-locating scheme does not rely on sample-based phase estimation; it works in Fourier space rather than in sample space. Furthermore, rather than necessarily performing simultaneously the operations locating coefficients and computing the values of the coefficients of the "heavy" (i.e., non-zero) frequencies, we can separate both processes. According to various embodiments, locating the support without attempting to estimate values accurately is a less complex task that can be carried out more rapidly and with higher probability of success than attempting to perform both tasks at once. As for the treatment of the high-dimensional problem, we reduce any d-dimensional problem to a 1-dimensional problem without substantial overhead cost through the use of rank-1 lattices, and demonstrate the correctness of this approach.
Computation of Values when Support Set S Is Known Accordingly, in one aspect, a method is provided for identifying magnitudes of frequency components of a signal f(x). The method includes obtaining a first group of sets of signal samples, where each set contains a number of samples of the signal f(x). The cardinality of each set is equal to or greater than an upper bound (R) of a number of non-zero frequency components of the signal f(x), and less than a number of samples N of the signal f(x) according to a Nyquist rate. N can also be the total number of frequency coefficients of the signal f(x). The cardinality can be prime number. The method also includes computing by a processor an initial set of frequency coefficients $f_0$ using a support set S and the first group of sets of signal samples. The support set S identifies indices of the non-zero frequency coefficients of the signal f(x).

Obtaining the first group of sets of signal samples may include accessing from memory T sets of signal samples, where T is on the order of O(1) or on the order of $O(R \log_R N)$. A t-th set of signal samples, wherein index t ranges from 1 through T, may include $P^{(t)}$ signal samples, where $P^{(t)}$ is greater than or equal to R and smaller than N. In some cases, $P^{(t)}$ can be a prime number, and/or a number less than R. Samples collected and stored in memory prior to the execution of various computations steps may be accessed from the memory.

Obtaining the first group of sets of signal samples may include determining the number of samples (N) of the signal f(x) according to the Nyquist rate, and obtaining the upper bound (R) of the number of non-zero frequency components of the signal. The number N itself is determined or estimated; N actual samples of the signal f(x) may not be obtained. In addition, the method includes selecting a number of sets (T), where T is on the order of O (1) or on the order of O(R logy N), and selecting T recovery parameters P($^t$), wherein index t ranges from 1 through T. One or more recovery parameters $P^{(t)}$ can be prime numbers. The method further includes, for each recovery parameter P($^t$), sampling the signal f(x) at $P^{(t)}$ distinct locations, providing the first group of T sets of signal samples, where each sample set has $P^{(t)}$ samples.

In some embodiments, computing the initial set of frequency coefficients $f_0$ includes multiplying the first group of sets of signal samples by: (i) a discrete Fourier transform (DFT) matrix F having T DFT submatrices, and (ii) a binary matrix B based on the support set S. The size of each submatrix is $P^{(t)}$. Each $P^{(t)}$ can be a prime number, and index t ranges from 1 through T. In some embodiments, the method includes generating a set of frequency coefficients f using a binary matrix B based on the support set S and the initial set of frequency coefficients to.

The method may also include determining that a norm based on a binary matrix B based on the support set S and the initial set of frequency coefficients $f_0$ is not less than a selected threshold. If the norm is greater than or equal to the selected threshold, the method includes obtaining a second group of sets of signal samples, each set in the second group also having a number of samples of the signal f(x). Cardinality of each set in the second group is a number less than N; the cardinality can be greater than R and/or a prime number. If the norm is greater than or equal to the selected threshold, the method includes re-computing the initial set of frequency coefficients $f_0$ using the support set S and the second group of sets of signal samples. In some embodiments, the method includes determining that a norm based on the binary matrix B and the re-computed initial set of frequency coefficients $f_0$ is less than or equal to the selected threshold, and generating a set of frequency coefficients f using the binary matrix B and the re-computed initial set of frequency coefficients $f_0$. The signal f(x) may be received from one or more signal source including a radar, a lidar, an antenna, a sonar, a camera, an infra-red sensor, an electro-magnetic radiation sensor, and an acoustic sensor.

In another aspect, a system is provided for identifying magnitudes of frequency components of a signal f(x). The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to: obtain a first group of sets of signal samples, where each set contains a number of samples of the signal f(x). The cardinality of each set is equal to or greater than an upper bound (R) of a number of non-zero frequency components of the signal f(x), and less than a number of samples N of the signal f(x) according to a Nyquist rate. N can also be the total number of frequency coefficients of the signal f(x). The cardinality can be prime number. The instructions also program the processing unit to compute an initial set of frequency coefficients $f_0$ using a support set S and the first group of sets of signal samples. The support set S identifies indices of the non-zero frequency coefficients of the signal f(x). In various embodiments, the instructions can program the processing unit to perform one or more of the method steps described above. In some embodiments, the system includes one or more signal samplers to obtain signal samplers, and one or more sample shufflers and/or filters to filter a shuffled set of samples.

In another aspect, an article of manufacture is provided that includes a non-transitory storage medium having stored therein instructions which, when executed by a processing unit program the processing unit, which is in electronic communication with a memory module, to identifying magnitudes of frequency components of a signal f(x). The instructions program the processing unit to: obtain a first group of sets of signal samples, where each set contains a number of samples of the signal f(x). The cardinality of each set is equal to or greater than an upper bound (R) of a number of non-zero frequency components of the signal f(x), and less than a number of samples N of the signal f(x) according to a Nyquist rate. N can also be the total number of frequency coefficients of the signal f(x). The cardinality can be prime number. The instructions also program the processing unit to compute an initial set of frequency coefficients to using a support set $\mathcal{S}$ and the first group of sets of signal samples. The support set $\mathcal{S}$ identifies indices of the non-zero frequency coefficients of the signal f(x). In various embodiments, the instructions can program the processing unit to perform one or more of the method steps described above.

Finding Aliased Support $\mathcal{S}_k$ when $\mathcal{S}_{k-1}$ or $\mathcal{M}_{k-1}$ Are Known In another aspect, a method is provided for identifying frequency components of a signal f(x). The method includes performing by a processor the following steps (a) through (d):

(a) initially designating a current set of candidate support coefficients ($\mathcal{M}_k$) as a current set of aliased support coefficients $\mathcal{S}_k$;

(b) obtaining a first set of K shuffled samples of the signal f(x) corresponding to a first sampling interval based on a first shuffling parameter, where K is a fraction of the number of samples (N) of the signal f(x) according to a Nyquist rate;

(c) filtering the shuffled samples in the first set, and computing a first group of frequency coefficients of the shuffled samples in the first set. Each frequency coefficient corresponds to a respective candidate support coefficient in the current set $\mathcal{S}_k$; and (d) removing from the current set of aliased support coefficients $\mathcal{S}_k$ a subset of candidate support coefficients wherein, for each candidate support coefficient in the subset a value of a corresponding computed frequency coefficient in the first group of frequency coefficients is less than a threshold.

In some embodiments, the method further includes obtaining a second set of shuffled samples of the signal f(x), corresponding to a second sampling interval based on a second shuffling parameter. In these embodiments, the method also includes filtering the shuffled samples in the second set, computing a second group of frequency coefficients of the shuffled samples in the second set, and removing from the current set of aliased support coefficients Sk a subset of candidate support coefficients where for each candidate support coefficient in the subset, i.e., each candidate support that this removed, a value of a corresponding computed frequency coefficient in the second plurality of frequency coefficients is less than the threshold. These steps may be repeated for additional sets of shuffled samples of the signal f(x), corresponding to respective sampling intervals based on respective shuffling parameters.

In some embodiments, the first shuffling parameter is a first coprime of an index limit ($M_k$) of the current set of candidate support coefficients ($\mathcal{M}_k$), and the second shuffling parameter is a second, different coprime of the index limit ($M_k$). The first and/or the second shuffling parameters can be prime numbers. An index limit ($M_k$) of the current set of candidate support coefficients ($\mathcal{M}_k$) may be associated with a support set growth factor $p_k$ that is a ratio of an index limit ($M_k$) and the number of samples in the first set of shuffled samples (K). The method may further include obtaining a prior set of aliased support coefficients $\mathcal{S}_{k-1}$, and dealiasing the prior set of aliased support coefficients to obtain the current set of candidate support coefficients ($\mathcal{M}_k$).

In some embodiments, the method further includes the following steps:

(e) selecting a next index limit ($M_{k+1}$) of a next set of candidate support coefficients ($\mathcal{M}_{k+1}$), where the next index limit is greater than a current index limit ($M_k$) of the current set of candidate support coefficients ($M_k$);

(f) after the step (d), dealiasing the current set of aliased support coefficients ($\mathcal{S}_k$) using the next index limit ($M_{k+1}$), to obtain the next set of candidate support coefficients ($\mathcal{M}_{k+1}$);

(g) updating the current set of candidate support coefficients ($\mathcal{M}_k$) by designating the next set of candidate support coefficients ($\mathcal{M}_{k+1}$) as the current set of candidate support coefficients ($\mathcal{M}_k$); and (h) repeating the steps (a) through (d) using the updated current set of candidate support coefficients ($\mathcal{M}_k$).

The method may also include determining that a next index limit ($M_{k+1}$) is not less than a number of samples (N) of the signal f(x) according to a Nyquist rate; and after the step (h), designating the current set of aliased support coefficients $\mathcal{S}_k$ as a final set of aliased support coefficients $\mathcal{S}$.

Obtaining the first set of shuffled samples of the signal f(x) may include selecting the first sampling interval using the first shuffling parameter ($Q_k^{(I)}$), wherein the first shuffling parameter ($Q_k^{(I)}$) corresponds to an index limit ($M_k$) of the current set of candidate support coefficients ($\mathcal{M}_k$). Obtaining the first set of shuffled samples may also include sampling the signal f(x) using the first sampling interval, to obtain a first sampled signal, and shuffling the first sampled signal using the first shuffling parameter and the index limit. Additionally or in the alternative, obtaining the first set of shuffled samples of the signal f(x) may include selecting the first shuffling parameter ($Q_k^{(I)}$) corresponding to an index limit ($M_k$) of the current set of candidate support coefficients ($M_k$), and accessing from memory the first set of shuffled samples corresponding to the first shuffling parameter.

Filtering the shuffled samples in the first set may include low-pass filtering. In some embodiments, the low-pass filtering includes filtering the first set using a Gaussian filter having a standard deviation (σ) that is based on an upper bound of a number of non-zero frequency components (R) of the signal f(x), to obtain a filtered shuffled signal.

In some embodiments, the method include generating the current set of candidate support coefficients by selecting a first index limit ($M_1$), where $M_1$ is less than the number of samples (N) of the signal f(x) according to the Nyquist rate. Generating the current set of candidate support coefficients may also include obtaining several samples of the signal f(x), determining $M_1$ frequency coefficients of a signal formed using the several samples, and including each non zero frequency coefficient from the $M_1$ frequency coefficients as a respective candidate support coefficient in the current set of candidate support coefficients. A non-zero frequency coefficient may include a frequency coefficient having a magnitude (also called an absolute value) greater than a specified threshold value. A frequency coefficient designated as a zero coefficient may have a magnitude less than or equal to the specified threshold value.

In another aspect, a system is provided for identifying frequency components of a signal f(x). The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to:
  (a) initially designate a current set of candidate support coefficients ($\mathcal{M}_k$) as a current set of aliased support coefficients $\mathcal{S}_k$;
  (b) obtain a first set of K shuffled samples of the signal f(x) corresponding to a first sampling interval based on a first shuffling parameter, where K is a fraction of the number of samples (N) of the signal f(x) according to a Nyquist rate;
  (c) filter the shuffled samples in the first set, and computing a first group of frequency coefficients of the shuffled samples in the first set. Each frequency coefficient corresponds to a respective candidate support coefficient in the current set $\mathcal{S}_k$; and
  (d) remove from the current set of aliased support coefficients $\mathcal{S}_k$ a subset of candidate support coefficients wherein, for each candidate support coefficient in the subset a value of a corresponding computed frequency coefficient in the first group of frequency coefficients is less than a threshold.

In various embodiments, the instructions can program the processing unit to perform one or more of the method steps described above. In some embodiments, the system includes one or more signal samplers to obtain signal samplers, and one or more sample shufflers and/or filters to filter a shuffled set of samples.

In another aspect, an article of manufacture is provided that includes a non-transitory storage medium having stored therein instructions which, when executed by a processing unit program the processing unit, which is in electronic communication with a memory module, to identify frequency components of a signal f(x). To this end, the instructions program the processing unit to perform one or more operations according to the method steps and/or the system described above.

Identifying Non-Zero Frequency Components of One and Multi-Dimensional Signals and Determining Values of the Non-Zero Frequency Components In another aspect, a method is provided for generating non-zero frequency coefficients of a signal f(x). The method includes performing by a processor the steps of: obtaining a group of sets of samples of the signal f(x), where the group includes a first set and a different second set. The method also includes determining indices of the non-zero frequency coefficients of the signal f(x) using at least the first set, and determining values of the non-zero frequency coefficients of the signal f(x) using the indices thereof and at least the second set.

Determining the indices of the non-zero frequency coefficients may include obtaining: (i) a number of samples (N) of the signal f(x) according to a Nyquist rate, and (ii) an upper bound of a number of non-zero frequency components (R) of the signal f(x). Only the number N may be determined or obtained, without actually collecting N samples. Determining the indices of the non-zero frequency coefficients may also include selecting a sample size K, a number of iterations P, one or more support set growth factors $p_k$, and one or more index limits $M_k$, where each index limit represents an index limit of a respective set of candidate support coefficients $\mathcal{M}_k$, where $M_k = p_k K$ and $N = K \Pi_{k=1}^{P} p_k$. Determining the indices of the non-zero frequency coefficients may further include determining a current set of aliased support coefficients $\mathcal{S}_k$ using the first set of samples of the signal f(x), the first set having less than N samples.

Determining the indices of the non-zero frequency coefficients may include performing one or more iterations, where at least one iteration includes obtaining a current set of candidate support coefficients $\mathcal{M}_k$ by dealiasing the current set of aliased support coefficients $\mathcal{S}_k$, and determining a next set of abased support coefficients using the current set of candidate support coefficients $\mathcal{M}_k$ and one or more sets of samples from the group of sets of samples of the signal f(x). Each of the one or more sets of samples may be obtained using a sampling interval based on $M_k$. Determining the indices of the non-zero frequency coefficients may also include designating the next set of aliased support coefficients as the current set of aliased support coefficients $\mathcal{S}_k$, for the next iteration.

Determining the indices of the non-zero frequency coefficients may include performing at least one iteration that includes obtaining a current set of candidate support coefficients $\mathcal{M}_k$ by dealiasing the current set of aliased support coefficients $\mathcal{S}_k$, and determining a next set of aliased support coefficients using the current set of candidate support coefficients $\mathcal{M}_k$ and one or more sets of samples from the group of sets of samples of the signal f(x). Each one of the one or more sets of samples may be obtained using a sampling interval based on $M_k$. Determining the indices of the non-zero frequency coefficients may also include designating the next set of aliased support coefficients as final set of aliased support coefficients $\mathcal{S}$, where the final set of aliased support coefficients represents the indices of the non-zero frequency coefficients.

The signal f(x) may include a one-dimensional signal obtained from one or more signal sources including a radar, a lidar, an antenna, a sonar, a camera, an infra-red sensor, an electro-magnetic radiation sensor, and an acoustic sensor. In some embodiments, the method includes mapping a multi-dimensional signal y(x) into a one-dimensional signal f(x), and storing an inverse mapping identifying a sample index for y(x) corresponding to a sample index for f(x). Obtaining the group of sets of samples of the signal f(x) may include selecting a number of sample indices of f(x), and obtaining samples of y(x) using sample indices of y(x), each one being determined via the inverse mapping of the respective selected sample index of f(x).

The non-zero frequency coefficients of the signal f(x) may represent non-zero frequency coefficients of the multi-dimensional signal y(x). The multi-dimensional signal y(x) may be obtained from one or more signal sources including a radar, a lidar, an antenna, a sonar, a camera, an infra-red sensor, an electro-magnetic radiation sensor, and an acoustic sensor. A non-zero frequency coefficient may include a frequency coefficient having a magnitude (also called an absolute value) greater than a specified threshold value. A frequency coefficient designated as a zero coefficient may have a magnitude less than or equal to the specified threshold value.

In some embodiments, determining the indices of the non-zero frequency coefficients is performed using a first value ($N_1$) of a number of samples of the signal f(x) according to a Nyquist rate, to obtain a first support set $S^1$. The step of determining the indices of the non-zero frequency coefficients is repeated using a second value ($N_2$) of the number of samples, to obtain a second support set $S^2$. Only the values $N_1$ and $N_2$ are used; $N_1$ and/or $N_2$ samples of the signal f(x) are not collected or used. In these embodiments, the method may also include generating a final support set as a union of the first and second support sets, and designating coefficients of the final support set as the indices of the non-zero frequency coefficients. The step of determining the indices of the non-zero frequency coefficients may be repeated using one or more additional values ($N_Z$) of the number of samples, to obtain one or more additional support sets, and by computing the union of all support sets.

In another aspect, a system is provided for generating non-zero frequency coefficients of a signal f(x). The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: obtain a group of sets of samples of the signal f(x), where the group includes a first set and a different second set, determine indices of the non-zero frequency coefficients of the signal f(x) using at least the first set, and determine values of the non-zero frequency coefficients of the signal f(x) using the indices thereof and at least the second set.

In various embodiments, the instructions can program the processing unit to perform one or more of the method steps described above. In some embodiments, the system includes one or more signal samplers to obtain signal samplers, and one or more sample shufflers and/or filters to filter a shuffled set of samples.

In another aspect, an article of manufacture is provided that includes a non-transitory storage medium having stored therein instructions which, when executed by a processing unit program the processing unit, which is in electronic communication with a memory module, to generate non-zero frequency coefficients of a signal f(x). To this end, the instructions program the processing unit to perform one or more operations according to the method steps and/or the system described above.

BRIEF DESCRIPTION OF THE DRAWINGS

In the following description, various embodiments of the present invention are described with reference to the following drawings, in which:

FIG. 1 is a table showing the runtime and sampling complexities of various known sFFT techniques and the last row shows the runtime and sampling complexities of a system according to one embodiment of our technique;

FIG. 2 depicts an overall process of determining the locations of the non-zero frequency components of a signal, and determining their values, according to one embodiment;

FIG. 10 is a table of various parameters used for experimental validation of a system according to one embodiment; and FIGS. 11A and 11B show comparison results for the performance of an embodiment of a system described herein with that of a known system.

DETAILED DESCRIPTION

Statement of the Problem and Preliminaries We introduce the notation used throughout the remainder of the discussion. Unless otherwise stated, we consider a one-dimension (1D) function or signal f(x) of the form:

$$f(x) = \sum_{j=0}^{n-1} e^{-2\pi i x j}(\hat{f}_j + \eta \hat{v}_j), \qquad (3)$$

for some finite $0 < N \in \mathbb{N}$ and noise level $0 \le \sqrt{N}\|\hat{v}\|_2 \le \eta$. It is further assumed that the vector f has real nonnegative elements, i.e., $\hat{f}_j \ge 0$, $\forall j$, and that its support:

$$S := \{j \in \{0, 1, \ldots, N-1\} : \hat{f}_j \ne 0\}$$

satisfies $0 \le \#S < R < N < \infty$, where #indicates cardinality. In particular, we are interested in the case where R N. Given some accuracy parameter E above the noise level $\eta$ the problem involves computing an R-sparse vector f * such that:

$$\|f^* - \hat{f}\|_2 \le \varepsilon \|\hat{f}_j\|_2$$

We shall denote by $\mathcal{F}$ the Fourier transform (and $\mathcal{F}*$ its inverse/adjoint), i.e., $$\mathcal{F}[\hat{f}(\xi)](x) = \int_{\mathbb{R}^d} e^{-2\pi i x \cdot \xi} \hat{f}(\xi) d\xi$$

where d represents the ambient dimension. The size-N Discrete Fourier Transform (DFT) is defined as:

$$f_{n;N} = [F_N \hat{f}]_n = \sum_{j=0}^{N-1} e^{-2\pi i \frac{nj}{N}} \hat{f}_j, n = 0, 1, \ldots, N-1. \quad (4)$$

A sparse FFT in 1D

We describe a fast way to compute the one-dimensional DFT of a bandlimited and periodic function f(x) of the form of Eq. (3). Our approach to solving this problem can be broken into two separate steps: in the first step, the support $S$ of the vector f is recovered, and in the second step, the nonzero values of f are computed using the knowledge of the recovered support. We describe the algorithm in the noiseless case, followed by a discussion of its stability to noise. Steps of the signal sampling and frequency-coefficient computation processes are provided in Algorithms 1-4.

Finding the Support

Figures 3, 4, 5:
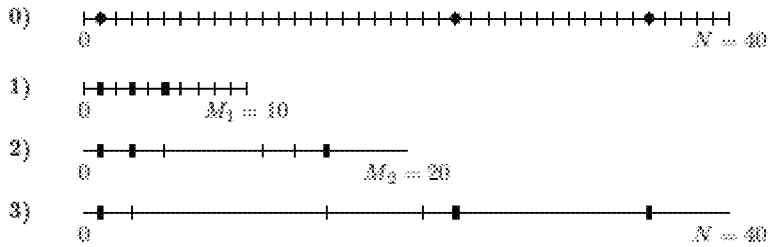
FIG. 3 shows an example of determining the locations of the non-zero frequency components of a signal, according to one embodiment.
FIG. 4 depicts a process of iteratively determining the locations of the non-zero frequency components of a signal, according to one embodiment.
FIG. 5 depicts a subprocess used by the process of FIG. 4, according to one embodiment.

Referring to the example in FIG. 3, from a high-level perspective, our support-finding scheme uses three major ingredients: 1) sampling or sub-sampling, 2) shuffling, and 3) low-pass filtering. Sampling or Sub-sampling reduces the size of the problem to a manageable level, but leads to aliasing. Nonetheless, when the nonnegativity assumption is satisfied, an aliased Fourier coefficient is nonzero if and only if its corresponding aliased lattice contains an element of the true support (the positivity condition avoids cancellation). This provides a useful criterion to discriminate between frequency elements that belong to the support and frequency elements that do not.

To illustrate, we proceed through an example and refer to FIG. 3. To begin with, consider k, N, $M_k \in \mathbb{N}$, $0 < \alpha < 1$ and $\mathcal{S}_k, \mathcal{W}_k, \mathcal{M}_k \subset \{0,1, \ldots, N-1\}$. We define the following:

- the aliased support $\mathcal{S}_k$ at iteration/step k corresponds to the indices of the elements of the true support $\mathcal{S}$ modulo $M_k$;
- the working support at iteration/step k corresponds to the set $\mathcal{W}_k := \{0,1, \ldots, M_k-1\}$;
- a candidate support $\mathcal{M}_k$ at iteration/step k is any set satisfying $\mathcal{S}_k \subset \mathcal{M}_k \subset \mathcal{W}_k$ of size $O(pR\log(R))$.

Line 0 (FIG. 3) represents a lattice (thin tickmarks) of size, $$N = 40 = 5\prod_{i=1}^{3} 2 = K\prod_{i=1}^{P} \rho_i$$

which contains only 3 positive frequencies (black dots, $\mathcal{S} = \{1, 23, 35\}$). In the beginning, (step k=0) only the fact that $\mathcal{S} \subset \{0, 1, \ldots, N-1\}$ is known.

The first step (k=1) is performed as follows: Letting:

$$M_1 = \frac{N}{\prod_{i=2}^{P} \rho_i} = \rho_1 K = O(R\log(R))$$

sample the function f(x) at, $$x_{n_1 \prod_{i=2}^{P} \rho_i; N} = \frac{n_1 \prod_{i=2}^{P} \rho_i}{N} = \frac{n_1}{M_1} = x_{n_1; M_1}$$

to obtain, $$f_{n_1 \prod_{i=2}^{P} \rho_i; N} = \sum_{j=0}^{N-1} e^{-2\pi i \frac{n_1 \prod_{i=2}^{P} \rho_i j}{N}} \hat{f}_j = \quad (5)$$

$$\sum_{l=0}^{M_1-1} e^{-2\pi i \frac{n_1 l}{M_1}} \left( \sum_{j: j \bmod M_1 = l} \hat{f}_j \right) = \sum_{l=0}^{M_1-1} e^{-2\pi i \frac{n_1 l}{M_1}} \hat{f}_l^{(1)} = f_{n_1; M_1}$$

for $n_1 \in \mathcal{M}_1 := \{0,1, \ldots, M_1-1\}$ defined as the candidate support in the first step.

The samples correspond to a DFT of size $M_1$ of the vector $\hat{f}^{(1)}$ with entries that are an aliased version of those of the original vector $\hat{f}$. These can be computed through the FFT in order $O(M_1 \log(M_1)) = O(R\log^2(R))$. In this first step, it is further possible to rapidly identify the aliased support $\mathcal{S}_i$ from the knowledge of $\hat{f}^{(1)}$ since the former correspond to the set, $$\{l \in \{0,1, \ldots, M_1-1\} : \hat{f}_l^{(1)} \neq 0\}$$

due to the fact that $$\hat{f}_l^{(1)} := \sum_{j: j \bmod M_1 = l} \hat{f}_j > 0 \wedge l \in \mathcal{S}_1$$

following the nonnegativity assumption. In our example, $M_1 = \rho_1 K = 2 \cdot 5 = 10$ which leads to $$\mathcal{S}_1 = \{1 \bmod 10, 23 \bmod 10, 35 \bmod 10\} = \{1,3,5\} = \{l \in \{0,1, \ldots, 9\} : \hat{f}_l^{(1)} \neq 0\}$$

$$\mathcal{W}_1 = \mathcal{M}_1 = \{0,1, \ldots, 9\}.$$

This is shown on line 1 of FIG. 3. For this first step, the working support $\mathcal{W}_1$ is equal to the candidate support $\mathcal{M}_1$.

Then, proceed to the next step (k=2) as follows: let, $$M_2 = \rho_2 M_1 = K \prod_{i=1}^{2} \rho_i = 5 \cdot 2^2 = 20$$

and consider the samples, $$f_{n_2 \prod_{i=3}^{P} \rho_i; N} = \sum_{l=0}^{M_2-1} e^{-2\pi i \frac{n_2 l}{M_2}} \left( \sum_{j: j \bmod M_2 = l} \hat{f}_j \right) = \sum_{l=0}^{M_2-1} e^{-2\pi i \frac{n_2 l}{M_2}} \hat{f}_l^{(2)} = f_{n_2; M_2}$$

for $n_2 = 0,1, \ldots, M_2-1$ as before. Here however, knowledge of $\mathcal{S}_1$ is incorporated. Indeed, since $M_2$ is a multiple of $M_1$, it follows upon close examination that, $$\mathcal{S}_2 \subset U_{k=0}^{\rho_1-1}(\mathcal{S}_1 + kM_1) := \mathcal{M}_2.$$

That is, the set $M_2$, defined as the union of $p_1 = O(1)$ translated copies of $S_i$, must itself contain $S_2$. Furthermore, it is of size $O(p_1 \#S_1) = O(pR\log(R))$ by construction. It is thus a proper candidate support (by definition). In our example, one obtains $$U_{k=0}^{1}(\mathcal{S}_1 + kM_1) = \{1,3,5\} \cup \{1+10, 3+10, 5+10\} = \{1,3,5, 11,13,15\} = \mathcal{M}_2,$$

which contains the aliased support, $$\mathcal{S}_2 = \{1 \bmod 20, 23 \bmod 20, 35 \bmod 20\} = \{1,3,15\}$$

as shown on line 2 of FIG. 3.

The working support becomes $W_2 := \{0,1,\ldots,19\}$. Once again, it is possible to recover $S_2$ by leveraging the fact that $\{l \in \{0,1,\ldots,M_2-1\}: \hat{f}_l^{(2)} \neq 0\} = S_2$. Here however, the cost is higher since computing $\hat{f}^{(2)}$ involves performing an FFT of size $M_2=20$. Continuing in the fashion of the first step, the cost would increase exponentially with k, so different steps are required to contain the cost. Such steps involve a special kind of shuffling and filtering of the samples followed by an FFT, and we describe this in detail below. Altogether, it is shown that $S_k$ can now be recovered from the knowledge of $\mathcal{M}_k$ at any step k using merely $\tilde{O}(R\log(R))$ samples and $\tilde{O}(R\log^2(R))$ computational steps.

Following the rapid recovery of $S_2$, we proceed in a similar fashion until $W_k := \{0,1,\ldots,N-1\}$ at which point $S_k = S$. Throughout this process, the size of the aliased support $S_k$ and candidate support $M_k$ remain of order $\mathcal{O}(R\log(R))$ while the size of the working support increases exponentially fast; i.e., $$\# \tilde{\mathcal{O}}_k = \mathcal{O}(K\Pi_{i=1}^k P_i) \geq 2^k \cdot R.$$

This therefore implies $$P = O\left(\log\left(\frac{N}{R}\right)\right)$$

"dealiasing" steps, and thus a total cost of $$\tilde{O}\left(R\log(R)\log\left(\frac{N}{R}\right)\right)$$

samples and $$\tilde{O}\left(R\log^2(R)\log\left(\frac{N}{R}\right)\right)$$

computational steps to identify S.

Thus, with reference to FIG. 3, the support $S$ is computed as follows. Line 0: Initialization; (unknown) elements of S correspond to black dots and lie in the grid $\{0, 1, \ldots, N-1\}$. Line 1: First step; elements of the candidate support $\mathcal{M}_l$ are represented by thin tickmarks and those of the aliased support $S_l$ by thick tickmarks. $S_l$ is a subset of $\mathcal{M}_1$ and both lie in the working support $\{0,1,\ldots,M_1-1\}$. Line 2: Second step; elements of the candidate support $\mathcal{M}_2$ correspond to thin tickmarks and are obtained through de-aliasing of $S_l$. Elements of the aliased support $S_2$ correspond to thick tickmarks. Both lie in the working support $\{0, 1, \ldots, M_2-1\}$. $M_2$ is a constant factor/multiple of $M_1$. Line 3: The final step correspond to the step when the working set is equal to $\{0,1,\ldots,N-1\}$. While FIG. 3 shows three iterations/steps, in general $$P = O\left(\log\left(\frac{N}{R}\right)\right)$$

iterations may be performed, where P can be any number such as 1, 5, 8, 10, 30, etc.

The steps of this support-recovery algorithm are described in Algorithm 2, the correctness of which is guaranteed by the following proposition, Proposition 1. In the noiseless case, Algorithm 2 outputs S, the support of the nonnegative R-sparse vector f with probability at least (1-p) using $$\tilde{O}\left(R\log(R)\log\left(\frac{N}{R}\right)\right)$$

samples and $$\tilde{O}\left(R\log^2(R)\log\left(\frac{N}{R}\right)\right)$$

computational steps.

Proof: Refer to Algorithm 2 and Proposition 5 as well as the above discussion.

From the knowledge of $S$, it is possible to recover the actual values of f rapidly and with few samples. This is the second major step of the sMFFT which we describe below.

Rapid Recovery of $S_k$ from Knowledge of Mk

Details are given here as to how to solve the problem of rapidly recovering the aliased support $S_k$ from the knowledge of a candidate support $\mathcal{M}_k$. Before proceeding, a few definitions are introduced.

Definition 1 Let $1 \leq K \leq M \in \mathbb{N}$. Then, define the set $\mathcal{A}(K; M)$ as, $$\mathcal{A}(K; M) := \left\{m \in \{0, 1, \ldots, M-1\}: m \leq \frac{K}{2} \text{ or } |m - M| < \frac{K}{2}\right\}$$

Definition 2 Let $0 < M \in \mathbb{N}$. Then, we define the set $Q(M)$ as, $$Q(M) := \{q \in [0,M) \cap \mathbb{Z}: q \perp M\},$$

where the symbol $\perp$ between two integers indicates they are coprime.

Algorithm 3 (FIG. 5) shows how to solve the aliased support recovery problem rapidly; correctness is guaranteed by Proposition 2, which relies on Proposition 5. Proposition 5 states that if the elements of an aliased vector of size $M_k$ with aliased support $S_k$ containing at most R nonzeros are shuffled (according to appropriate random permutation) and subsequently convoluted with a (low-frequency) Gaussian (or another low pass filter function), then the probability that the resulting value at a location $m \in S_k^c$ is of order O(1) is small. If $m \in S_k$ the value at m is of order O(1) with probability 1.

This realization allows us to develop an efficient statistical test to identify $S_k$ from the knowledge of $\mathcal{M}_k$. The process is shown schematically in FIG. 6. Specifically, the following four steps are performed: 1) permute samples randomly, 2) apply a diagonal Gaussian filter, 3) compute a small FFT, 4) eliminate elements that do not belong to the aliased support. Instead of a Gaussian filter, any other low-pass filter can be applied.

Figure 6:
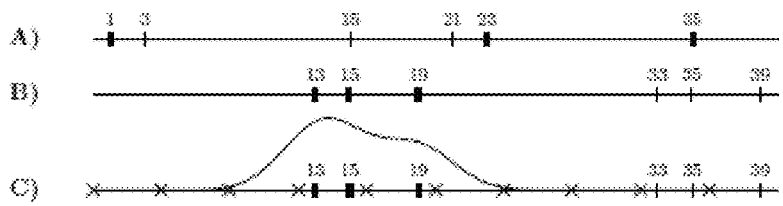
FIG. 6 shows an example of determining the aliased locations of the non-zero frequency components of a signal, according to one embodiment of the subprocess shown in FIG. 5.

To illustrate, we once again proceed through an example shown in FIG. 6. To begin with, assume $M_k=40$, and $$S_k=\{1,23,35\}, \mathcal{M}_k=\{1,3,15,21,23,35\}, W_k=\{1,2,\ldots,39\}$$

as in step/iteration k=3 shown in Algorithm 2. This alias support is shown at line A of FIG. 6.

The first step is to randomly shuffle the elements of $\mathcal{M}_k$ within $W_k$ by applying a permutation operator $\Pi_Q(\cdot)$ in the sample space:

$$\Pi_Q(f_{n;M_k}) = f_{(n[Q]_{M_k}^{-1}) \bmod M_k; M_k} \quad (6)$$

for some integer $Q \in Q(M_k)$ ($[Q]_{M_k}^{-1}$ being the unique inverse of Q modulo Mk) by Lemma 3. This is equivalent to shuffling in frequency space as: $j \to (jQ) \bmod M_k$. Indeed, after shuffling, evaluating at $(jQ) \bmod M_k$ gives, $$\hat{f}^{(k)}_{((jQ) \bmod M_k)[Q]_{M_k}^{-1}) \bmod M_k} = \hat{f}^{(k)}_j.$$

Furthermore, Lemma 4 shows that if Q is chosen uniformly at random within $Q(M_k)$, the mapped elements of the candidate support $\mathcal{M}_k$ will be more or less uniformly distributed within the working support $\mathcal{W}_k$, $$\mathbb{P}(|(iQ) \bmod M_k - (jQ) \bmod M_k| \le C | i \ne j) \le O\left(\frac{C}{M_k}\right).$$

This step is followed by the application of a diagonal Gaussian filtering operator $\psi_\sigma(\cdot)$ having elements:

$$g_\sigma\left(\frac{m}{M_k}\right) = \sqrt{\pi} \sigma \sum_{h \in \mathbb{Z}} e^{-\pi^2 \sigma^2 \left(\frac{m+hM}{M}\right)^2} \quad (7)$$

in the sample space (step 2). Instead of a Gaussian filter, any other low-pass filter can be applied. By the properties of the Fourier transform, this is equivalent to a convolution in the frequency space (line C, FIG. 6), implying the equality:

$$[\Psi_\sigma(\Pi_Q(f_{n;M_k}))](\xi) = \mathcal{F}^*\left[\sum_{j \in S_k} \hat{f}_j^{(k)} e^{-\frac{|x-(jQ) \bmod M_k|^2}{\sigma^2}}\right](\xi). \quad (8)$$

The function is now bandlimited (with bandwidth of order $O(K)$ due to our choice for a, the standard deviation of the Gaussian filter (or a low-pass filter, in general) that is applied, as shown in Algorithm 3, so this expression can be discretized (samples x, FIG. 6) to produce our main expression, $$\phi_n^{(k)}(Q) = F_{\mathcal{A}(K,M_k)}[\Psi_\sigma(\Pi_Q(f_{n;M_k}))]_n = \quad (9)$$

$$\frac{1}{M_k} \sum_{m \in \mathcal{A}(K,M_k)} e^{2\pi i \frac{nm}{K}} g_\sigma\left(\frac{m}{M_k}\right) f_{(m[Q]_{M_k}^{-1}) \bmod M_k; M_k}$$

In particular, we note that if n if of the form $$j\frac{M_k}{K}$$

for j=0, ..., K−1, the last step can be performed through a small size-K FFT. This corresponds to step 3 of the aliased support recovery algorithm. The knowledge of, $$\left\{\phi_{j\frac{M_k}{K}}^{(k)}\right\}_{j=0}^{K-1}$$

can be used to recover $\mathcal{S}_k$ from $\mathcal{M}_k$ rapidly, which can be seen as follows.

By construction, $\phi_n^{(k)}$ can be "large" only if the distance between n and some element belonging to the shuffled and aliased support, i.e., some element of $\{(lQ) \bmod M_k\}_{l \in \mathcal{S}_k}$, is smaller than $O(\sigma)$, which in turn occurs only if the distance between $$\left[n\frac{K}{M_k}\right]\frac{M_k}{K}$$

and the shuffled elements of the aliased support is smaller than $O(\sigma)$, as well (by the triangle inequality). However, because of the randomness introduced by the shuffling, and because of the particular choice of a, Proposition 5 shows that for any fixed $n \in \mathcal{M}_k$, the probability that a computed element $$\phi_{\left[nQ \bmod M_k\right]\frac{K}{M_k}}^{(k)}\frac{M_k}{K}$$

is "large" for multiple independent trials is small if $n \in \mathcal{M}_k \cap \mathcal{S}_k^c$ and equal to 1 if $n \in \mathcal{M}_k \cap \mathcal{S}_k$. This fact allows for the construction of an efficient statistical test based on the knowledge of the quantities found in Eq. (9) to discriminate between the points of $\mathcal{M}_k \cap \mathcal{S}k$ and those of $M_k \cap S_k$ (step 4). Such a test forms the core of Algorithm 3, and its correctness follows from the Proposition 2.

Proposition 2. In the noiseless case, Algorithm 3 outputs $S_k$, the aliased support of the and equal to 1 if n E vector f at step k, with probability at least (1-p) using $\tilde{O}((\log(p)R\log(R))$ samples and $\tilde{O}(\log g(p)R\log^2(R))$ computational steps.

Proof. Refer to Algorithm 3 and Proposition 5 as well as the above discussion.

Thus, according to FIG. 6, finding the aliased support $\mathcal{S}_k$ from knowledge of $\mathcal{M}_k$ involves receiving $\mathcal{M}_k$ (line A)). First, indices are shuffled in sample space leading to a shuffling in frequency space (line B)). A Gaussian or another low pass filter is applied followed by a small FFT (line C)) on a grid G(x). The points of $\mathcal{M}_k$ for which the value of the result of the last step at their closest neighbor in G is small are discarded, leaving only the aliased support $\mathcal{S}_k$.

As for the computational cost, the permutation and filtering (multiplication) steps (1 and 2) both incur a cost of $\tilde{O}(R\log(R))$ since only the samples for which the filter is of order O(1) are considered (and there are $O(K) = \tilde{O}(R\log(R))$ of them following our choice of $\sigma$ and K). These are followed by an FFT (step 3) of size O(K) which carries a cost of order $\tilde{O}(R\log^2(R))$. Finally, step 4 involves checking a simple property on each of the $M_k$ elements of $M_k$ incurring a cost of $\tilde{O}(R\log(R))$. This is repeated $O(\log(p))$ times for a probability (1-p) of success.

Thus, extracting $S_k$ from $M_k$ requires merely $\tilde{O}(\log(p)R\log(R))$ samples and $\tilde{O}(\log(p)R\log^2(R))$ computational time for fixed p.

Recovering Values from Knowledge of the Support

Figure 7:
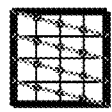
FIG. 7 depicts a process of determining the values of the non-zero frequency components of a signal when their locations are known, according to one embodiment.

Assume a set size O(K) containing the support $\mathcal{S}$ has been recovered. We now show how the values of the nonzero Fourier coefficients of f in Eq. (3) can be rapidly computed using this information. For this purpose, assume f(x) can be sampled at locations:

$$\left\{\frac{q \bmod P^{(t)}}{P^{(t)}}\right\}_{q=0}^{P^{(t)}-1}$$

for t=0,1, . . . , T, and $\{P^{(t)}\}_{t=1}^{T}$ are some random prime or co-prime numbers on the order of $\mathcal{O}(R\log_R(N))$ (see Algorithm 4, shown in FIG. 7). It follows that $$f^{(t)}_{q \bmod P^{(t)}; P^{(t)}} = \sum_{j \in \mathcal{S}} e^{-2\pi i \frac{q(j \bmod P^{(t)})}{P^{(t)}}} \tag{10}$$

$$\hat{f}_j = \sum_{l=0}^{P^{(t)}-1} e^{-2\pi i \frac{ql}{P^{(t)}}} \left(\sum_{j \in \mathcal{S}: j \bmod P^{(t)} = l} \hat{f}_j\right)$$

for t=0,1, . . . , T. The outer sum is seen to be a DFT of size $P^{(t)}$ of a shuffled and aliased vector, whereas the inner sum can be expressed as the application of a binary matrix Ba 3 with entries $$B^{(t)}_{q,j} = \begin{cases} 1 & \text{if } j \bmod P^{(t)} = q \\ 0 & \text{else} \end{cases}$$

to the vector with entries' index corresponding to those of the support of f. In particular, each such matrix is sparse with exactly #$\mathcal{S}$=O(R) nonzero entries.

Eq. (10) can further be written in matrix form as:

$$[FB]\,\hat{f} = \begin{bmatrix} F^{(1)} & 0 & \ldots & 0 \\ 0 & F^{(2)} & \ldots & 0 \\ \ldots & \ldots & \ldots & \ldots \\ 0 & 0 & \ldots & F^{(T)} \end{bmatrix} \begin{bmatrix} B^{(1)} \\ B^{(2)} \\ \ldots \\ B^{(T)} \end{bmatrix} \hat{f} = \begin{bmatrix} f^{(1)} \\ f^{(2)} \\ \ldots \\ f^{(T)} \end{bmatrix} = f_0, \tag{11}$$

where $F^{(t)}$ is a standard DFT matrix of size $P^{(t)}$. Proposition 6 states that if T=O(1) is sufficiently large, then with nonzero probability $$\frac{1}{T}(FB)^*(FB) = I + \mathcal{P},$$

where I is the identity matrix and $\mathcal{P}$ is a perturbation with 2-norm smaller than $$\frac{1}{2}.$$

When this occurs, one can solve a linear system through the Neumann series, i.e., $$\hat{f} = \sum_{n=0}^{\infty} (I - B^*B)^n (FB)^* f_0.$$

This forms the core of Algorithm 4. Proposition 3 provides the correctness of this algorithm. Since each matrix $B^{(t)}$ contains exactly R nonzero entries, both B and B*B can be applied in order $RT = \mathcal{O}(R\log_R(N))$ steps. In addition, since F is a block diagonal matrix with T=O(1) blocks consisting of DFT matrices of size $\mathcal{O}(R\log_R(N))$, it can be applied in order $\tilde{\mathcal{O}}(R\log(N))$ using the FFT computation. Finally, for an accuracy) η the Neumann series can be truncated after $\mathcal{O}(\log(\eta))$ terms, and the process may be repeated at most log(p) times for a probability p of success. Therefore, the cost of computing the nonzero values of f is bounded by $\tilde{\mathcal{O}}((\log(p)+\log(\eta))R \log(N))$ and uses at most $\mathcal{O}((\log(p)+\log(\eta))R \log_R(N))$ samples.

Proposition 3. Given the support $\mathcal{S}$ of $\hat{f}$ is known, Algorithm 4 outputs an approximation to the nonzero elements of $\hat{f}$ with error bounded by η in the $\ell^2$-norm, with probability greater than or equal to 1-p using $\mathcal{O}((\log(p)+\log(\eta))R \log_R(N))$ samples and $\tilde{\mathcal{O}}((\log(p)+\log(\eta))R \log(N))$ computational steps.

Stability to Low-level Noise

As discussed previously, the theory underlying Algorithms 1 through 4 has been designed for vectors that are exactly sparse. Here, we discuss the effect of low-level noise. In fact, we show that if the sparse vector of Fourier coefficients takes the form $\hat{f}+\hat{v}$, where $\sqrt{N}\|\hat{v}\|_2 < \eta$ for some "small" $\mathcal{S}$, an embodiment of the sMFFT technique can recover the support and values of f with the same guarantees as described earlier.

Support Recovery

An important quantity for the fast recovery of the support is the set of frequency coefficients of shuffled and filtered samples, as described in Eq. (9), so in the presence of noise, $$\phi_n^{(k)}(Q) = \frac{1}{M_k} \sum_{m \in \mathcal{A}(K,M_k)} e^{2\pi i \frac{nm}{K}} \tag{12}$$

$$g_\sigma\left(\frac{m}{M_k}\right)\left(\hat{f}_{(m[Q]_{M_k}^{-1}) \bmod M_k; M_k} + \hat{v}_{(m[Q]_{M_k}^{-1}) \bmod M_k; M_k}\right).$$

The second term in this expression is the error term and can be uniformly bounded by the following lemma:

Lemma 1. Assuming the noise term $\hat{v}$ is such that $$\|\hat{v}\|_2 < \frac{\eta}{\sqrt{N}},$$

the error term of the computed value in Eq. (12) is uniformly bounded by the error term of the computed value in $$\|\psi_n^{(k)}(Q)\|_\infty = \left\|\frac{1}{M_k} \sum_{m \in \mathcal{A}(K,M_k)} e^{2\pi i \frac{nm}{K}} g_\sigma\left(\frac{m}{M_k}\right) \hat{v}_{(m[Q]_{M_k}^{-1}) \bmod M_k; M_k}\right\|_\infty < \mathcal{O}(\eta).$$

Algorithm 2 tests whether $$\left|\phi^{(k)}_{[iQ^{(l)} \bmod M_k]\frac{K}{M_k}]\frac{M_k}{K}}(Q^{(l)})\right| > \delta\mu$$

in order to discriminate between elements of the candidate and aliased supports. The presence of noise can skew this test in two ways: 1) by bringing the computed value below the threshold when i∈ $S_k$, or 2) by bringing the value above the threshold multiple times when i∉ $S_k$. Either way, if η is small enough, i.e., such that $$\|\psi_n^{(k)}(Q^{(l)})\|_\infty \le \frac{\delta\mu}{2},$$

the conclusion of Proposition 5 follows through with similar estimate, by simply replacing δ with $$\frac{\delta}{2}$$

in the proof.

Recovering Values from Knowledge of the Support

It is quickly observed that the recovery of the values is a well-conditioned problem. Indeed, since $$\frac{1}{T}(FB)^*(FB) = I - \mathcal{P},$$

and $$\|\mathcal{P}\|_2 \le \frac{1}{2}$$

with high probability by Proposition 6, a simple argument based on the singular value decomposition produces the following corollary, Corollary 1. Under the hypothesis of Proposition 6, $$\left(\frac{1}{T}(FB)^*(FB)\right)^{-1}$$

exists, and $$\left\|\left(\frac{1}{T}(FB)^*(FB)\right)^{-1}\right\|_2 \le 2$$

with probability greater than or equal to $$\frac{1}{2}.$$

Therefore, the output of Algorithm 4 is such that $$\|\hat{f}^{sMFFT} - \hat{f}\|_2 \le \left\|\left(\frac{1}{T}(FB)^*(FB)\right)^{-1}\right\|_2 \|(FB)^*v\|_2 \le 2\|B\|_2\|v\|_2 = O(\eta).$$

This, together with Proposition 3, demonstrates the stability of Algorithm 4 in the noisy case.

The Multi-Dimensional Sparse FFT

Whenever dealing with the multidimensional DFT/FFT, it is assumed that the function of interest is both periodic and bandlimited with fundamental period $[0,1)^d$ i.e., $$f(x) = \sum_{j\in([0,M)\cap\mathbb{Z})^d} e^{-2\pi i x \cdot j} \hat{f}_j$$

for some finite $M\in\mathbb{N}$ and $j\in\mathbb{Z}^d$, up to some rescaling. Computing the Fourier coefficients is $$\hat{f}_n = \int_{[0,1]^d} e^{-2\pi i n \cdot x} f(x) dx,$$

and this can be achieved through a "dimension-by-dimension" trapezoid rule $$\hat{f}_{(j_1,j_2,\ldots,j_d)} = \sum_{n_1=0}^{M-1} \frac{e^{2\pi i \frac{j_1 n_1}{M}}}{M} \tag{13}$$

$$\left(\ldots\left(\sum_{n_{d-1}=0}^{M-1} \frac{e^{2\pi i \frac{j_{d-1} n_{d-1}}{M}}}{M}\left(\sum_{n_d=0}^{M-1} \frac{e^{2\pi i \frac{j_d n_d}{M}}}{M} f_{(n_1,n_2,\ldots,n_d)}\right)\right)\right).$$

However, Proposition 4 below shows that it is also possible to re-write the d-dimensional DFT as that of a 1D function with Fourier coefficients equal to those of the original function, but with different ordering.

Proposition 4. (Rank-1 d-dimensional DFT) Assume the function $f:[0,1)^d \to \mathbb{C}$ has form (13). Then, $$\int_{[0,1]^d} e^{-2\pi i j \cdot x} f(x)dx = \frac{1}{N}\sum_{n=0}^{N-1} e^{-2\pi i j \cdot x_n} f(x_n) \text{ for all } j \in [0, M)^d \cap \tag{14}$$

$$\mathbb{Z}^d, \text{ where } x_n = \frac{ng \bmod N}{N},$$

$$g = (1, M, M^2, \ldots, M^{d-1}) \text{ and } N = M^d.$$

Now, the right-hand side of Eq. (14) can be written in two different ways (due to periodicity); namely, $$\frac{1}{N}\sum_{n=0}^{N-1} e^{-2\pi i j \frac{ng \bmod N}{N}} f\left(\frac{ng \bmod N}{N}\right) = \frac{1}{N}\sum_n e^{-2\pi i \frac{(j\cdot g)n}{N}} f\left(\frac{ng}{N}\right)$$

Figures 8A, 8B:
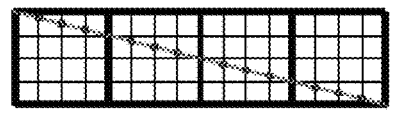
FIGS. 8A and 8B illustrate a mapping of a multi-dimensional signal into a one-dimensional signal, according to one embodiment.

Geometrically, the left-hand side represents a quadrature rule with points $$x_n = \frac{ng \bmod N}{N}$$

distributed (more-or-less uniformly) in $[0, 1)^d$, as shown at points 802 in FIG. 8A. The right-hand side represents an equivalent quadrature where the points $$x_n = \frac{ng}{N}$$

now lie on a line embedded in $\mathbb{R}^d$, as shown at points 806 in FIG. 8B. The location at which the lattice (thin black lines) intersects represents the standard multidimensional DFT samples. Thus, Proposition 4 allows one to write any d-dimensional DFT as a one-dimensional DFT by picking the appropriate sample points (Proposition 4) and proceeding to a re-ordering of the Fourier coefficients through the isomorphism $$\tilde{n}: \{n \in ([0,M) \cap \mathbb{Z})^D\} \ni n \cdot g = n_0 + n_1 M + \ldots + n_{D-1} M^{D-1} \in [0, M^D) \cap \mathbb{Z}^D.$$

We use this sort of sampling to treat of the multidimensional problem, which we first convert to a 1D problem. Then, we address the 1D problem through Algorithms 1 through 4, and then map the result back to its original d-dimensional space. Specifically, the sampling points corresponding to a 1-D signal that is equivalent to the multi-dimensional signal are obtained using Algorithms 1 through 4. Using inverse mapping between the multi-dimensional signal and the 1-D signal, the corresponding points of the multi-dimensional signal are identified and sampled.

FIGS. 8A and 8B generally describe geometric interpretation of rank-1 d-dimensional DFT in 2D. The thick black boxes represent fundamental periodic domain. The dots 802, 804 represent rank-1 discretization points. The 2D grid represents standard discretization points. In FIG. 8A, the rank-1 d-dimensional quadrature interpreted as a 2D discretization over the fundamental periodic region. In FIG. 8B, the rank-1 d-dimensional quadrature interpreted as a uniform discretization over a line in $\mathbb{R}^2$.

In general, there is no need for the signal's spectrum to reside on a regular grid. Indeed if the signal is sparse in the continuous domain, one can approximate such function on the hypercube by a function which spectrum does lie on a regular grid, and which spectral support correspond to the closest neighbor of the original spectral support within the regular grid. For some error $\epsilon$, a grid with spacing $$O\left(\frac{1}{\epsilon}\right)$$

containing $$N = O\left(\frac{1}{\epsilon^d}\right)$$

unknowns should suffice.

An Example System for Generating Frequency Components of a Signal

Figure 9:
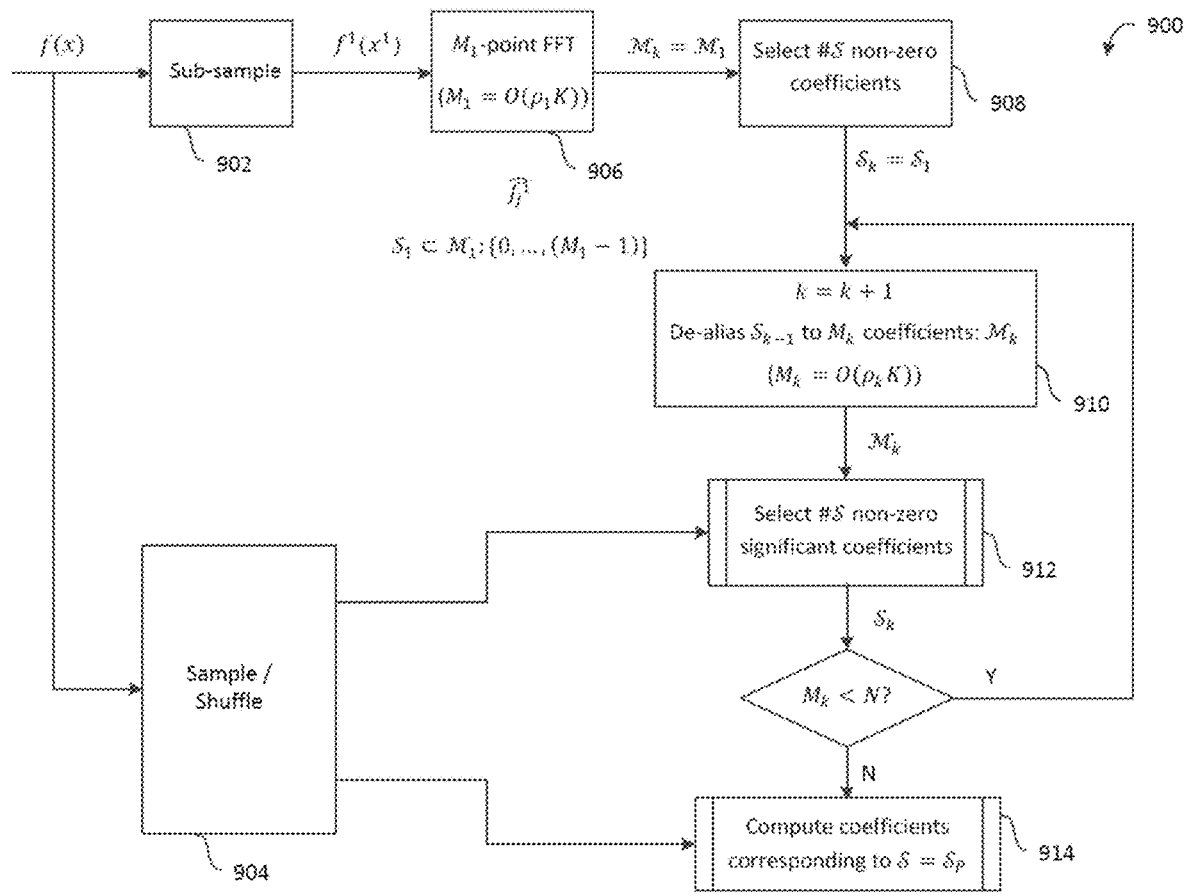
FIG. 9A schematically depicts a system for determining the locations of the non-zero frequency components of a signal, determining their values, and collecting signal samples that are required, according to one embodiment.
FIG. 9B schematically depicts a subsystem for collecting samples of a signal, where the samples are used for determining the locations and/or values of the non-zero frequency components of the signal, according to one embodiment.

With reference to FIG. 9A, an sMFFT generation system 900 can generate the non-zero frequency components of a received signal f(x). The signal f(x) can be received from one or more signal sources such as a radar, a lidar, an antenna, a sonar, a camera, an infra-red sensor, an electromagnetic radiation sensor, or an acoustic sensor. In some implementations, a signal received from a source may be preprocessed, e.g., filtered to limit the bandwidth of the signal. The bandwidth of the signal f(x) and/or a maximum frequency corresponding to the signal f(x) may be known or estimated. Using the bandwidth and/or the maximum frequency, the number of samples N that must be collected during a window of length $\tau$ seconds so as to facilitate the conventional DFT/FFT transformation of the signal f(x) is determined. In general, if the maximum frequency is $f^{max}$ according to the Nyquist sampling rate $N \geq 2 * f^{max} * \tau$. N can also be the total number of frequency coefficients of the signal f(x). In addition, an upper bound R on the number of non-zero frequency components of the signal f(x) is also provided to the system 900 or is estimated.

Using the parameters N and R, one or more of other parameters of the system may be computed or selected. These parameters include an FFT size K, a number of iterations P, an index limit Mk for the candidate support set $\mathcal{M}_k$ used in the k-th iteration, and a support set growth factor $p_k$. In various implementations, these parameters may be related according to the expressions $N = K \Pi_{k=1}^P p_k$; and $M_k = K p_k = O(R \log R)$. The system 900 may also determine various shuffling parameters $Q_k^l$, where l ranges from 1 through a parameter L, using the values $M_k$. In addition, the system 900 may determine, using the values $M_k$, various value recovery parameters $P^{(l,t)}$, where l ranges from 1 through the parameter L and t ranges from 1 through a parameter T, discussed above. In some implementations, L=1. The shuffling and value recovery parameters can be used for sampling the signal f(x).

In particular, the system 900 includes a sampling/sub-sampling module 902 and a sampling and shuffling module 904. In some implementations, the shuffling module can be different module. The sampling/sub-sampling module 902 samples the signal f(x) using the parameters $M_1$ and N, and generates a set of samples $f^1(x^1)$. A Fourier transform of these samples (e.g., an $M_1$-point FFT) is performed in the module 906 to obtain $M_1$ frequency coefficients, which are designated as the candidate support set $\mathcal{M}_1$. The non-zero coefficients from the set $\mathcal{M}_l$ are selected in the module 908 and designated as the support set $S_1$. In a de-aliasing module 910, the value of $M_k$ is used to de-alias a previously generated support set $S_{k-1}$, as discussed above. For example, the support set $S_1$ can be de-aliased to obtain the candidate support set $\mathcal{M}_2$. De-aliasing can be performed in the frequency domain, i.e., using indices of the aliased frequency components, and without requiring values of those components or samples of the signal f(x). Thereafter, the significant non-zero coefficients of the candidate support set $\mathcal{M}_k$ are selected in the module 912, to obtain the support set $S_k$. This step requires one or more sets of signal samples, which may have been obtained a priori or may be obtained as needed by the sampling/shuffling module 904. During this process, the index limit $M_k$ of the candidate support set $\mathcal{M}_k$ grows according to the growth factor $p_k$.

The operations in the modules 910, 912 are repeated using the new support set $S_k$ if it is determined that $M_k < N$. These iterations are generally described above with reference to Algorithms 2 and 3. After P iterations, i.e., when $M_k$ is no longer less than N or is equal to N, the support set $S_p$ generated in the last iteration is considered to be the final support set S. The values of the frequency components corresponding to the indices in the final support set S are determined at the recovery module 914 according to Algorithm 4 discussed above. The determination of the values also requires one or more sets of samples of the signal f(x). These sample set(s) can be obtained a priori or as needed by the sampling/shuffling module 904.

Figure 9B:
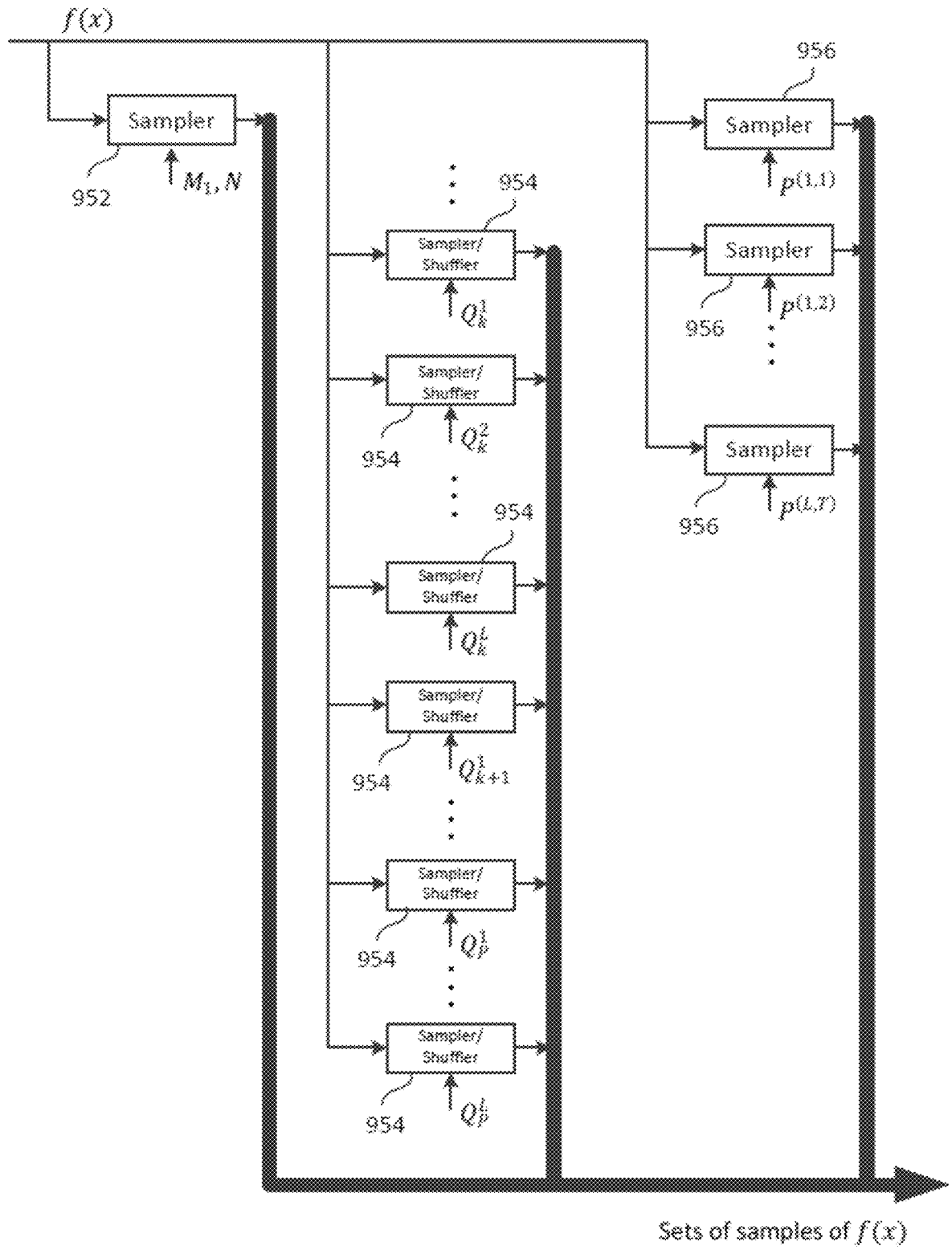

FIG. 9B shows a sampler 952 that uses the parameters $M_1$ and N to obtain samples of f(x) that can be used to generate the candidate support set $M_1$, as discussed above. The sampling/sub-sampling module 902 (FIG. 9A) can be or may include the sampler 952. The sampling/shuffling module 904 (FIG. 9A) may include one or more of the other modules depicted in FIG. 9B.

Specifically, the modules 954 use the shuffling parameters $Q_k^l$, where l ranges from 1 through the parameter L (which can have the value 1), and k ranges from 1 or 2 through the number of iterations P. The values of $Q_k^l$ depend on the values of the index limits Mk, as described above. A distinct set of samples of the signal f(x) may be obtained for each value of $Q_k^1$. In some implementations, instead of using a different sampler 954 for each $Q_k^1$, fewer samplers, and as few as a single sampler 954 may be used. One or more samplers 954 may be tunable to perform sampling according to one or more values $Q_k^1$. In some embodiments, the samplers 954 also include the corresponding shufflers. In other implementations, shuffling, as described above, may be performed in different module(s).

The modules 956 use the recovery parameters $P^{(i,t)}$, where l ranges from 1 through the parameter L (which can have the value 1), and t ranges from 1 through T, as described above. The values of $P^{(i,t)}$ depend on the parameters N and/or R, as described above. Here again, a distinct set of samples of the signal f(x) may be obtained for each value of $P^{(i,t)}$. In some implementations, instead of using a different sampler 956 for each $P^{(i,t)}$, fewer samplers, and as few as a single sampler 956 may be used. One or more samplers 956 may be tunable to perform sampling according to one or more values $P^{(i,t)}$. In some embodiments, the samplers 956 also include the corresponding shufflers. In other implementations, shuffling, as described above, may be performed in different module(s).

In some implementations, all the sampling is performed a priori, i.e., before the determination of any or at least some of the support sets $S_k$. The different sample sets are stored in memory and are accessed as needed. In other implementations, the sampling and the computation of the support sets and/or the recovery of the frequency coefficients may be interleaved. In some implementations, a set of samples is obtained by performing sampling only when it is needed for the determination of the support set or for recovery of the frequency coefficient values.

Generalization to General Complex Sparse Vectors

We now describe certain additional steps for transforming the sMFFT for real positive vectors into a reliable process for general complex vectors. To achieve this task, two major hurdles, both associated with the support-recovery portion of the scheme, are overcome; the first one is associated with the initial aliasing of the signal described, as discussed above. As shown in Eq.(5), at each step aliasing implies Fourier coefficients of the form, $$\hat{f}_l^{(k)} = \Sigma_{j:j \bmod M_k = l} \hat{f}_j, l=0,1,\ldots,M_k.$$

When the original nonzero coefficients are all strictly positive, this expression is positive if and only if the lattice $$l + iM_k, i = 0, 1, \ldots \frac{N}{M_k} - 1$$

contains one of the original non-zero coefficients. When the non-zero coefficients are complex, however, this is no longer true.

The second potential issue pertains to the resulting filtering step found in Algorithm 3. As described by Eq. (8), the result takes the form, $$[\Psi_\sigma(\Pi_Q(f_{n;M_k}))](\xi) = \mathcal{F}^*\left[\sum_{j \in S_k} \hat{f}_j^{(k)} e^{-\frac{|x-(j[Q]_{M_k}^{-1} \bmod M_k)|^2}{\sigma^2}}\right](\xi).$$

which corresponds to the Fourier transform of the aliased signal convoluted with a Gaussian.

Once again, the statistical test used in Algorithm 3 relies on this quantity being positive if and only if a point lies in the vicinity of an element of the (shuffled and aliased) support $S_k$. Such statement does not hold true if we allow the coefficients to be general complex numbers (as some elements might cancels out).

It follows from these observations that as a consequence of the lack of positivity, it is possible that elements belonging to $\mathcal{M}_k \cap S_k$ might be wrongfully eliminated in Algorithm 3, i.e., the false negative identification rate is non-trivial. To alleviate these issues, we describe a modified scheme, where we accommodate for the possibility that the output of Algorithm 3 may be missing one or more elements of $S$ k, by launching multiple independent iterations of the FIND_SUPPORT(·) process in Algorithm 1, and by taking the union of the outputs. In this sense, although it is possible to miss an element with a single run, we expect that the probability of a miss over multiple independent run is very small. In one implementation, up to log p independent iterations, using different values of N, are launched.

This modification does not have any effect on the fundamental computational complexity; indeed, close examination shows that these additional steps only increase the algorithmic constant by some small quantity independent of N and/or R. We have implemented this modification and it provided good numerical results in line with our expectation based on the previous discussion, and very similar to those obtained in the real-positive case.

Numerical Results

We have implemented our sMFFT algorithms in MATLAB® and present a few numerical results which exhibit the efficient scaling. All simulations were carried out on a small cluster possessing 4 Intel Xeon E7-4860 v2 processors and 256 GB of RAM, with the MATLAB flag -singleCompThread to ensure fairness through the use of a single computational thread. The numerical experiments presented here fall in two categories: 1) dependence of running time as a function of the total number of unknowns N for a fixed number of nonzero frequencies R, and 2) dependence of running time as a function of the number of nonzero frequencies R for a fixed total number of unknowns N. All experiments were carried out in three dimensions (3D) with additive Gaussian noise with variance r. The nonzero values of f were picked randomly and uniformly at random in [0.5, 1.5], and the remaining parameters were set according to Table 2, shown in FIG. 10. All comparisons are perdormed with the MATLAB fftn(·) function, which uses a dimension-wise decomposition of the DFT and a 1D FFT routine along each dimension.

For case 1), we picked R=50 nonzero frequencies distributed uniformly at random on a 3D lattice having $N^{1/3}$ elements in each dimension for different values of $N \in [10^3, 10^{10}]$. The results are shown in FIG. 11A, which depicts the running time vs. the number of unknowns (N) for the MATLAB fftn(−) and the sMFFT in three dimensions (3D), with R=50 nonzeros and noise $n=10^{-3}$. It can be observed that the cost of computing the DFT through the sMFFT remains more or less constant with N, whereas that the cost of the MATLAB fftn(·) function increases linearly. This is the expected behavior and demonstrates the advantages of the sMFFT technique over the FFT. Also note that the largest relative $\ell^2$-error observed was $9.3 \cdot 10^{-3}$ which is on the order of the noise level, as predicted by the theory.

For case 2), we fixed $N=0(10^8)$ and proceeded to compare the sMFFT algorithm with the MATLAB fftn(−) function as before (w/parameters found in Table 2). The results are shown in FIG. 11B, which depicts the running time vs number of nonzero frequencies (R) for the MATLAB fftn (−)and the sMFFT in three dimensions (3D) and for $N=10^8$ and noise $\eta=10^{-3}$. In this case, the theory states that the sMFFT algorithm should scale quasi-linearly with the number of nonzero frequencies R. A close look shows that it is indeed the case. For this case, the largest relative $\ell^2$-error observed was $1.1 \cdot 10^{-2}$, again on the order of the noise level and in agreement the theory. Finally, the cost of the MATLAB fftn(−) function remains constant as the FFT scales like $\mathcal{O}(N \log(N))$ and is oblivious to R.

We have introduced a sparse multidimensional FFT (sMFFT) for computing the DFT of a Nx1 sparse, real-positive or complex vector (having R non-zeros) that is stable to low-level noise, that exhibits a sampling complexity of ($\mathcal{O}(R\log(R)\log(N))$) and a computational complexity ($\mathcal{O}(R\log^2(R)\log(N))$). This technique also has a scaling of $\mathcal{O}(\log(p))$ with respect to probability of failure, $\mathcal{O}(\log(\eta))$ with respect to accuracy and O(1) with respect to dimension. We have provided a rigorous theoretical analysis of our approach demonstrating this efficient and accurate computation of the non-zero frequency coefficients of a signal. We have implemented our algorithm and provided numerical examples in 3D successfully demonstrating the benefits of the scaling that can be achieved using implementations of our technique.

Proofs

We present all proofs and accompanying results related to the statements presented in the discussion above.

Lemma 2. Let $0<G<Q\leq N\in \mathbb{N}$ $Q \perp N$. Then the map, $$n\in\{0,1,\ldots,N-1\}\to nQ \bmod N \subset \{0,1,\ldots,N-1\}$$

is an isomorphism.

Proof. Since the range is discrete and a subset of the domain, it suffices to show that the map is injective. Surjectivity will then follow from the pigeon hole principle. To show injectivity, consider $i, j \in \{0,1,\ldots,N-1\}$, and assume, $$iQ \bmod N = jQ \bmod N$$

This implies (by definition) that there exists some integer p such that, $$(i-j)Q=pN$$

so that N divides $(i-j)Q$. However, $N \perp Q$ so N must be a factor $(i-j)$. Now, i, j are restricted to $\{0,1,\ldots,N-1\}$ so, $$|i-j|<N,$$

and the only integer divisible by N that satisfies this equation is 0. Thus, $$i-j=0 \Leftrightarrow i=j$$

which demonstrates injectivity.

Lemma 3. Let $0<Q<M$ be an integer coprime to M and, $$f_n = \sum_{l=0}^{M-1} e^{-2\pi i \frac{nl}{M}} \hat{f}_l$$

Then, $$\frac{1}{M}\sum_{n=0}^{M-1} e^{2\pi i \frac{mn}{M}} f_{(nQ) \bmod M} = \hat{f}_{(m[Q]_M^{-1}) \bmod M}$$

where $0<[Q]M^{-1}<M$ is the unique integer such that $[Q]_M^{-1}Q \bmod M = 1 \bmod M$.

Proof. Consider $$\frac{1}{M}\sum_{n=0}^{M-1} e^{2\pi i \frac{mn}{M}} f_{(nQ) \bmod M} = \sum_{l=0}^{M-1}\left(\frac{1}{M}\sum_{n=0}^{M-1} e^{2\pi i \frac{n}{M}(m-Ql \bmod M)}\right)\hat{f}_l =$$

$$\sum_{l=0}^{M-1}\left(\frac{1}{M}\sum_{n=0}^{M-1} e^{2\pi i \frac{nQ}{M}(m[Q]_M^{-1} \bmod M - l)}\right)\hat{f}_l$$

However, $$\frac{1}{M}\sum_{n=0}^{M-1} e^{2\pi i \frac{nQ}{M}(m[Q]_M^{-1} \bmod M - l)} = \frac{1}{M}\sum_{j=0}^{M-1} e^{2\pi i \frac{j}{M}(m[Q]_M^{-1} \bmod M - l)} = \delta_{m[Q]_M^{-1} \bmod M, l},$$

where the second equality follows from the fact that $m \to m[Q]_M^{-1} \bmod M$ is an isomorphism (Lemma 2).

This implies that $$\frac{1}{M}\sum_{n=0}^{M-1} e^{2\pi i \frac{mn}{M}} f_{(nQ) \bmod M} = \hat{f}_{(m[Q]_M^{-1}) \bmod M}$$

as claimed.

Lemma 4. Let $M \in \mathbb{N}/\{0\}$ and let Q be a uniform random variable over $Q(M)$ (Definition 2). Then, $$\mathbb{P}(|jQ \bmod M| \leq C) \leq O\left(\frac{C}{M}\right)$$

for all $0<j<M$ (up to a $\log(\log(M))$ factor).

Proof. Fix $0<j$, $k<M$ and let $\gamma = \gcd(j, M)$. Consider, $$\mathbb{P}(jQ \bmod M = k) =$$

$$\sum_{q\in Q(M)} \mathbb{P}(jq \bmod M = k | Q=q)\mathbb{P}(Q=q) = \sum_{q\in Q(M)} \mathbb{1}_{jq \bmod M=k}(q)\mathbb{P}(Q=q)$$

and note that, $$\mathbb{P}(Q=q) = \frac{1}{\#Q(M)} = \frac{1}{\phi(M)} \leq \frac{e^\zeta \log(\log(M)) + \frac{3}{\log(\log(M))}}{M}$$

following bounds on the Euler totient function $\phi(\cdot)$ ([33]), where $\zeta$ is the Euler-Mascheroni constant, and since Q is uniformly distributed in $Q(M)$. Therefore, $$\mathbb{P}(jQ \bmod M = k) \leq \frac{e^\zeta \log(\log(M)) + \frac{3}{\log(\log(M))}}{M}\sum_q \mathbb{1}_{jq \bmod M=k}(q)$$

We now show that the quantity $\sum_q \mathbb{1}_{jq \bmod M=k}(q)$ is bounded above and below by, $$\gamma - 1 \leq \sum_q \mathbb{1}_{jq \bmod M=k}(q) \leq \gamma$$

To see this, first note that this quantity corresponds to the number of integers q which hash to the integer k through the map q→(jq) mod M. Now, assume there exists some q such that $$jq \bmod M = k, \tag{15}$$

which implies that $$jq + iM = k \tag{16}$$

for some integer $i \in \mathbb{Z}$. This is a Diophantine equation which has infinitely many solutions if and only if gcd(j, M)=γ divides k. Otherwise, it has no solution. Assuming it does and $(q_0, i_0)$ is a particular solution, all remaining solutions must take the form $$q = q_0 + u\frac{M}{\gamma}, \quad i_0 - u\frac{j}{\gamma}$$

where $u \in \mathbb{Z}$. However, since $0 \leq q < M$ the number of possible solutions must be such that, $$\gamma - 1 \leq \# \left\{ q \in [0, M): q = q_0 + u\frac{M}{\gamma} \right\} \leq \gamma.$$

which proves the claim. Thus, $$\mathbb{P}(jQ \bmod M = k) \leq \left( e^{\tilde{\gamma}} \log(\log(M)) + \frac{3}{\log(\log(M))} \right) \frac{\gamma}{M}$$

We can now treat $\mathbb{P}(|jQ \bmod M| \leq C)$. Before we proceed however, recall that Eq.(15) has a solution if and only if γ|k. We then write, $$\mathbb{P}(|jQ \bmod M| \leq C) = \sum_{0 \leq k \leq C} \mathbb{1}_{\gamma|k}(k) \mathbb{P}(nQ \bmod M = k)$$

from which it follows that, $$\mathbb{P}(|jQ \bmod M| \leq C) \leq \left( e^{\tilde{\gamma}} \log(\log(M)) + \frac{3}{\log(\log(M))} \right) \frac{\gamma}{M} \sum_{0 \leq k \leq C} \mathbb{1}_{\gamma|k}(k) \leq$$
$$\left( e^{\tilde{\gamma}} \log(\log(M)) + \frac{3}{\log(\log(M))} \right) \frac{\gamma}{M} \frac{C}{\gamma} \leq \left( e^{\tilde{\gamma}} \log(\log(M)) + \frac{3}{\log(\log(M))} \right) \frac{C}{M}$$

since the number of integers in 0<k<C that are divisible by γ is bounded above by $$\frac{C}{\gamma}.$$

Finally, since this holds regardless of our choice of j, this proves the desired result.

Lemma 5. Consider a function f(x) of the form of Eq.(3) and satisfying a certain constraint. Let $$0 < \sigma = O\left( \frac{M}{R\sqrt{\log(R)}} \right), \quad 0 < \delta < 1 \text{ and,}$$

$$\mu = \min_{j \in S} |\hat{f}_j|$$

$$\Delta = \frac{\max_{j \in S} |\hat{f}_j|}{\min_{j \in S} |\hat{f}_j|} = \frac{\|\hat{f}\|_\infty}{\mu}$$

Finally, let $F\mathcal{A}_{(K;M)}(\cdot)$ and $\psi_\sigma(\cdot)$ be the operators found in Eq.(9). Then, there exists a constant $1 < C < \infty$ such that if, $$K \geq C \frac{M\sqrt{\log\left(\frac{2\Delta}{\delta}\right)}}{\pi\sigma} \tag{17}$$

the inequality, $$[F_{\mathcal{A}(K;M)}(\Psi_\sigma(f_{k;M}))]_{n\frac{M}{K}} \geq \delta\mu$$

implies that $$\inf_{j \in S} \left| n\frac{M}{K} - j \right| \leq \sigma \sqrt{\log\left( \frac{2R\Delta}{\delta} \right)} \tag{18}$$

and, $$\inf_{j \in S} \left| n\frac{M}{K} - j \right| \leq \sigma \sqrt{\log\left( \frac{1}{\delta} \right)},$$

implies that $$[F_{\mathcal{A}(K;M)}(\Psi_\sigma(f_{k;M}))]_{n\frac{M}{K}} \geq \delta\mu$$

for all n ∈ {0,1, . . . ,K−1}.

Proof. Consider the quantity $$\frac{1}{M} \sum_{m \in \mathcal{A}(K;M)} e^{2\pi i \frac{n\frac{M}{K}m}{M}} \hat{g}_\sigma\left(\frac{m}{M}\right) f_{m;M} = \sum_{j \in S} \left( \frac{1}{M} \sum_{m \in \mathcal{A}(K;M)} e^{2\pi i \frac{m}{K}(n-j)} \hat{g}_\sigma\left(\frac{m}{M}\right) \right) \hat{f}_j \tag{19}$$

and recall that, $$\frac{1}{M} \hat{g}_\sigma\left(\frac{m}{M}\right) = \frac{\sqrt{\pi}\sigma}{M} \sum_{h \in \mathbb{Z}} e^{-\pi^2 \sigma^2 \left(\frac{m+hM}{M}\right)^2}$$

where $$\mathcal{A}(K; M) := \qquad\qquad\qquad\qquad\text{(Definition 1)}$$
$$\left\{ m \in \{0, 1, \ldots, M-1\}: m \leq \frac{K}{2} \text{ or } |m - M| < \frac{K}{2} \right\}.$$

From this expression, it is apparent that there exists some constant $1<C<\infty$ such that by choosing $$K \geq C \frac{M\sqrt{\log\left(\frac{2\Delta}{\delta}\right)}}{\pi\sigma},$$

one has, $$\left|\sum_{j\in S}\left(\frac{1}{M}\sum_{m\in\mathcal{A}^c(K;M)}e^{2\pi i\frac{m}{K}(n-j)}\hat{g}_\sigma\left(\frac{m}{M}\right)\right)\hat{f}_j\right| \leq$$

$$\sum_{m\in\mathcal{A}^c(K;m)}\left(\frac{\sqrt{\pi}\sigma}{M}\sum_{h\in\mathbb{Z}}e^{-\pi^2\sigma^2\left(\frac{m+hM}{M}\right)^2}\right)\|\hat{f}\|_\infty \leq \frac{\delta\mu}{2}$$

Indeed, by the integral test, $$\sum_{m\in\mathcal{A}^c(K;m)}\left(\frac{\sqrt{\pi}\sigma}{M}\sum_{h\in\mathbb{Z}}e^{-\pi^2\sigma^2\left(\frac{m+hM}{M}\right)^2}\right) \leq A\frac{\sqrt{\pi}\sigma}{M}\sum_{m\geq\frac{K}{2}}e^{-\pi^2\sigma^2\left(\frac{m}{M}\right)^2} \leq$$

$$A\frac{\sqrt{\pi}\sigma}{M}e^{-\pi^2\sigma^2\left(\frac{K}{2M}\right)^2} + \frac{\sqrt{\pi}\sigma}{M}\int_{\frac{K}{2}}^\infty e^{-x^2\left(\frac{\pi\sigma}{M}\right)^2}dx \leq$$

$$A\frac{\sqrt{\pi}\sigma}{M}e^{-\pi^2\sigma^2\left(\frac{K}{2M}\right)^2} + \frac{1}{\sqrt{\pi}}\mathrm{erfc}\left(\frac{\pi K\sigma}{2M}\right) \leq Be^{-\pi^2\sigma^2\left(\frac{K}{2M}\right)^2}$$

for some positive constants A, B, and where the last inequality follows from estimates on the complementary error function and the fact that $$\frac{\sqrt{\pi}\sigma}{M} = O\left(\frac{1}{R\sqrt{\log(R)}}\right)$$

by assumption. Therefore, $$[F_{\mathcal{A}(K;M)}(\Psi_\sigma(f_{m;M}))]_{n\frac{M}{K}} = \frac{1}{M}\sum_{m\in\mathcal{A}(K;M)}e^{2\pi i\frac{nm}{K}}\hat{g}_\sigma\left(\frac{m}{M}\right)f_{m;M} =$$

$$\frac{1}{M}\sum_{m=0}^{M-1}e^{2\pi i\frac{n\frac{M}{K}m}{M}}\hat{g}_\sigma\left(\frac{m}{M}\right)f_{m;M} + \varepsilon_n = \sum_{j\in S}e^{-\frac{\left(n\frac{M}{K}-j\right)^2}{\sigma^2}}\hat{f}_j + \varepsilon_n$$

where $$\max_n|\varepsilon_n| \leq \frac{\delta\mu}{2}.$$

Now assume:

$$\left|[F_{\mathcal{A}(K;M)}(\Psi_\sigma(f_{k;M}))]_{n\frac{M}{K}}\right| \geq \delta\mu.$$

Then, the triangle inequality and the previous equation imply that, $$\sum_{j\in S}e^{\frac{\left(n\frac{M}{K}-j\right)}{\sigma^2}}\hat{f}_j \geq \left|[F_{\mathcal{A}(K;M)}(\Psi_\sigma(f_{m;M}))]_{n\frac{M}{K}}\right| - \frac{\delta\mu}{2} \geq \left(\delta-\frac{\delta}{2}\right)\mu = \frac{\delta}{2}\mu. \quad (20)$$

We claim that this cannot occur unless,

$$\inf_{j\in S}\left|n\frac{M}{K}-j\right| \leq \sigma\sqrt{\log\left(\frac{2R\Delta}{\delta}\right)}. \quad (21)$$

We proceed by contradiction. Assume the opposite holds. Then, $$\sum_{j\in S}e^{\frac{\left(n\frac{M}{K}-j\right)}{\sigma^2}}\hat{f}_j \leq \|\hat{f}\|_\infty\sum_{j\in S}e^{-\frac{\left(n\frac{M}{K}-j\right)^2}{\sigma^2}} < \|\hat{f}\|_\infty\frac{\delta}{2\Delta} = \frac{\delta\mu}{2}$$

by assumption. This is a contradiction. Thus, Eq.(21) must indeed hold. This proves the first part of the proposition. For the second part, assume $$\inf_{j\in S}\left|n\frac{M}{K}-j\right| \leq \sigma\sqrt{\log\left(\frac{1}{\delta}\right)} \quad (22)$$

holds. Letting j* be such that $$\left|n\frac{M}{K}-j^*\right| = \inf_{j\in S}\left|n\frac{M}{K}-j\right|,$$

we note that, $$\sum_{j\in S}e^{-\frac{\left(n\frac{M}{K}-j\right)^2}{\sigma^2}}\hat{f}_j \geq e^{-\frac{\left(n\frac{M}{K}-j^*\right)^2}{\sigma^2}}\hat{f}_{j^*} \geq \delta\mu$$

since f and the Gaussian are all positive by assumption. This shows the second part.

We are now ready to prove the validity of the Algorithm 1.

Proposition 5. (Correctness of Algorithm 3) Consider a function f(x) of the form of Eq.(3) and satisfying the nonnegativity hypothesis, and let $\Pi_Q(\bullet)$, $\psi_\sigma(\bullet)$ and $F_K(\bullet)$ be the operators found in Eq.(9) where $\delta$, $\mu$, $\Delta$ and, $K$ are as in Lemma 5 and, $K$ satisfies the additional constraint $$K > \frac{R}{\alpha}\sqrt{\frac{\log\left(\frac{2R\Delta}{\delta}\right)}{\log\left(\frac{1}{\delta}\right)}},$$

and $$\sigma = \frac{\alpha\frac{M}{2R}}{\sqrt{\log\left(\frac{2R\Delta}{\delta}\right)}} \quad (23)$$

for some 0<α<1. Assume further that the integers $\{Q^{(l)}\}_{l=1}^L$ are chosen independently and uniformly at random within Q(M), for some 1≤L∈ ℕ. Consider $$\phi_{[i\frac{K}{M}]\frac{M}{K}}(Q^{(l)}) := [F_{\mathcal{A}(K;M)}(\Psi_\sigma(\Pi_{Q^{(l)}}(f_{k;M})))]_{[i\frac{K}{M}]\frac{M}{K}} \quad (24)$$

Then, $$\mathbb{P}\left(\cap_{l=1}^L \left\{ \left|\phi_{[i\frac{K}{M}]\frac{M}{K}}(Q^{(l)})\right| \geq \delta\mu \right\}\right) \leq \alpha^L \quad (25)$$

for every i such that $(i[Q]_M^{-1}) \bmod M \notin \mathcal{S}^c$, and $$\left|\phi_{[i\frac{K}{M}]\frac{M}{K}}(Q^{(l)})\right| \geq \delta\mu$$

almost surely for all $Q^{(l)}$ and every i such that $(i[Q]M^1) \bmod M \in \mathcal{S}$.

Proof. From independence, the probability in Eq. (25) is equal to, $$\prod_{l=1}^L \mathbb{P}\left(\left|\phi_{[iQ \bmod M)\frac{K}{M}]\frac{M}{K}}(Q)\right| \geq \delta\mu\right).$$

So it is sufficient to consider a fixed 1. Assume first that $i[Q]_M^{-1} \bmod M \notin \mathcal{S}$. As a consequence of Lemma 5 and Lemma 3 we have the inclusion, $$\left\{\left|\phi_{[i\frac{K}{M}]\frac{M}{K}}(Q)\right| \geq \delta\mu\right\} \subset \left\{\inf_{j\in\mathcal{S}}\left|\left[i\frac{K}{M}\right]\frac{M}{K} - (jQ)\bmod M\right| \leq \sigma\sqrt{\log\left(\frac{2R\Delta}{\delta}\right)}\right\} \subset$$

$$\bigcup_{j\in\mathcal{S}}\left\{\left|((i[Q]_M^{-1}\bmod M) - j)Q)\bmod M\right| \leq \sigma\sqrt{\log\left(\frac{2R\Delta}{\delta}\right)} + \frac{M}{2K}\right\},$$

which implies that the probability for each fixed 1 is bounded by, $$\mathbb{P}\left(\left|\phi_{[i\frac{K}{M}]\frac{M}{K}}(Q^{(l)})\right| \geq \delta\mu\right) \leq$$

$$\sum_{j\in\mathcal{S}}\mathbb{P}\left(\left|((i[Q]_M^{-1}\bmod M - j)Q^{(l)})\bmod M\right| \leq \sigma\sqrt{\log\left(\frac{2R\Delta}{\delta}\right)} + \frac{M}{2K}\right) \leq$$

$$O\left(R\left(\frac{\sigma\sqrt{\log\left(\frac{2R\Delta}{\delta}\right)} + \frac{M}{2K}}{M}\right)\right) = O(\alpha),$$

by the union bound, by Lemma 4 (since $i[Q]M^1 \bmod M \neq j$) and by assumption. Therefore, $$\mathbb{P}\left(\cap_{l=1}^L \left\{\left|\phi_{[i\frac{K}{M}]\frac{M}{K}}(Q^{(l)})\right| \geq \delta\mu\right\}\right) \leq O(\alpha^L)$$

as claimed. As for the second part of the proposition, note that if $i[Q]M^1 \bmod M \in \mathcal{S}$ then $$\inf_{j\in\mathcal{S}}\left|\left[i\frac{K}{M}\right]\frac{M}{K} - (jQ)\bmod M\right| \leq \inf_{j\in\mathcal{S}}\left|((i[Q^{(l)}]_M^{-1})\bmod M - j)Q \bmod M\right| + \frac{M}{2K} =$$

$$\frac{M}{2K} \leq \sigma\sqrt{\log\left(\frac{1}{\delta}\right)}$$

by assumption. By Lemma 5, this implies that $$\left|\phi_{[i\frac{K}{M}]\frac{M}{K}}(Q^{(l)})\right| \geq \delta\mu$$

and since this is true regardless of the value of the random variable Q(1), we conclude that it holds almost surely.

Remark. A careful study of the proof of Lemma 5 and Proposition 5 shows that the order $\mathcal{O}(R\sqrt{\log(R)})$ size of K arises from the need to bound quantities of the form $$\sum_{j\in\mathcal{S}} e^{-\frac{(n\frac{M}{K}j)^2}{\sigma^2}}.$$

In the worst-case scenario (the case treated by Lemma 5), this requires estimates of the form of Eq.(17), Eq.(18) and Eq.(23) which introduce an extra $\sqrt{\log(R)}$ factor in the computational cost (Section 3) relative to the (conjectured) optimal scaling. However, throughout the algorithm the elements of any aliased support $\mathcal{S}_k$ appearing in the sum are always subject to random shuffling first. Lemma 4 states that the shuffling tends to be more of less uniform. Now, were the elements i.i.d. uniformly distributed, it would be easy to show that these quantities are of order $\mathbf{0(1)}$ with high probability, removing the need for the extraneous factor. Unfortunately, our current theoretical apparatus does not allow us to prove the latter. However, following this argument and numerical experiments, we strongly believe that it is possible. In this sense, we believe that through a slight modification of the choice of parameters, our algorithm exhibits an (optimal) O (Rlog(R)log(N)) computational complexity with the same guarantees of correctness as the current scheme.

Lemma 6. Let $\{P^{(t)}\}_{t=1}^T$ be prime numbers greater than or equal to R∈ ℕ, and let i, j∈ {0, 1, . . . , N−1} such that, $i \bmod P^{(t)} = j \bmod P^{(t)}, t=1,2,\ldots,T.$ If T>$\log_R$(N), then i=j.

Proof. Consider $\{P^{(t)}\}_{t=1}^T$ as described above and T>$\log_R$(N), and assume that $i \bmod P^{(t)} = j \bmod P^{(t)}$ for t=0, 1, . . . , T. This implies in particular that $P^{(t)}|(j-i)$ for t=0, 1, . . . , T, and that $lcm(\{P^{(t)}\}_{t=1}^T)|(j-i).$ However, since the integers $\{P^{(t)}\}_{t=1}^T$ are prime (and therefore coprime), $$lcm(P^{(t)}) = \prod_{t=1}^T P^{(t)} \geq \left(\min_t P^{(t)}\right)^T \geq R^{\log_R(N)} = N.$$

This implies that, $|j-i| \geq N$, since $i \neq j$, and this is a contradiction since both belong to $\{0, 1, N-1\}$.

Corollary 2. Let $\{P^{(t)}\}_{t=1}^T$ are as in Lemma 6 and that $i \neq j$, $k \neq l$, $i, j, k, l \in \{0, 1, N-1\}$ are such that, $i \bmod P^{(t)} = j \bmod P^{(t)}$ $k \bmod P^{(t)} = l \bmod P^{(t)}$ for $t = 1, 2, \ldots, T$. Then, $(i-j) = (k-l)$ Proof. The statement is equivalent to, $(i-j) \bmod P^{(t)} = 0 = (k-l) \bmod P^{(t)}$ for $t = 1, 2, \ldots T$. By Lemma 6, this implies that $(j-i) = (k-l)$.

Proposition 6. Let $0 < R < N$. Further let $\{P^{(t)}\}$ be random integers uniformly distributed within the set P containing the $4R \log_R(N)$ smallest prime numbers strictly larger than R, and let F and B be defined as in Eq. (11) with these parameters. If $T > 4$, then, $$\mathbb{P}\left(\left\|\left(I - \frac{1}{T}(FB)^*(FB)\right)x\right\|_2 > \frac{1}{2}\right) \leq \frac{1}{2}$$

Proof. First, note that, $(FB)^*(FB) = B^* F^* FB = B^* B$ since F is a block-diagonal Fourier matrix, and $$I - \frac{1}{T} B^* B$$

has entries $$\left[I - \frac{1}{T} B^{(t)*} B^{(t)}\right]_{ij} = \qquad (26)$$

$$\delta_{i,j} - \frac{1}{T} \sum_s B_{si}^{(t)} B_{sj}^{(t)} = \begin{cases} \frac{1}{T} & \text{if } i \bmod P^{(t)} = j \bmod P^{(t)} \\ 0 & o.w. \end{cases}$$

Therefore, for any vector x such that $\|x\|_2 = 1$, $$\mathbb{P}\left(\left\|\left(I - \frac{1}{T}(FB)^*(FB)\right)x\right\|_2 > \frac{1}{2}\right) \leq 4\mathbb{E}\left[\left(\sum_{i \neq j} \sum_t \bar{x}_i [B^{(t)*} B^{(t)}]_{ij} x_j\right)^2\right] =$$

$$4 \sum_{i \neq j} \sum_{k \neq l} \bar{x}_i x_j x_k \bar{x}_l \sum_{s,t} \mathbb{E}\left[[B^{(t)*} B^{(t)}]_{ij} [B^{(s)*} B^{(s)}]_{kl}\right]$$

by Chebyshev inequality. Furthermore, thanks to Eq.(26) and independence, the expectation can be written as, $$\mathbb{E}\left[[B^{(t)*} B^{(t)}]_{ij} [B^{(s)*} B^{(s)}]_{kl}\right] = \qquad (27)$$

$$\begin{cases} \mathbb{P}(\{(i-j) \bmod P^{(t)} = 0\}) \mathbb{P}(\{(k-l) \bmod P^{(t)} = 0\}) & \text{if } s \neq t \\ \mathbb{P}(\{(i-j) \bmod P^{(t)} = 0\} \cap \{(k-l) \bmod P^{(t)} = 0\}) & \text{if } s = t \end{cases}$$

Now, let $T(i, j)$ be defined as $\tau(i,j) := \{P^{(t)} \in \mathcal{P} : i \bmod P^{(t)} = j \bmod P^{(t)}\}$.

The case $s \neq t$ is treated as follows, $$\mathbb{P}(\{(i-j) \bmod P^{(t)} = 0\}) \mathbb{P}(\{(k-l) \bmod P^{(s)} = 0\}) =$$

$$\left(\sum_{p_1 \in \tau(i,j)} \mathbb{P}(\{(i-j) \bmod P^{(t)} = 0\} | P^{(t)} = p_1) \mathbb{P}(P^{(t)} = p_1)\right) \cdot$$

$$\left(\sum_{p_2 \in \tau(k,l)} \mathbb{P}(\{(k-l) \bmod P^{(s)} = 0\} | P^{(s)} = p_2) \mathbb{P}(P^{(s)} = p_2)\right) \leq$$

$$\left(\frac{\#\tau(i,j)}{4R \log_R(N)} \frac{\#\tau(k,l)}{4R \log_R(N)}\right) \leq \frac{1}{16R^2}$$

since $P^{(t)}$ is uniformly distributed within a set of cardinality $4R \log_R(N)$, and because, $$\sum_{p_1 \in \tau(i,j)} \mathbb{P}(\{(i-j) \bmod P^{(t)} = 0\} | P^{(s)} = p_1) = \#\tau(i,j) = \log_R(N)$$

by Lemma 6. This leaves us the case $s = t$. To this purpose, we further split this case into two subcases: that when $i-j = k-l$ and that when $i-j \; k-l$. When $i-j = k-l$ we obtain, $$\sum_{s,t=1}^T \mathbb{P}(\{s = t\} \cap \{i-j = k-l\} \cap \{(i-j) \bmod P^{(t)} = 0\} \cap \{(k-l) \bmod P^{(s)} = 0\}) =$$

$$\sum_{p \in \tau(k,l)} \mathbb{P}(\{(k-l) \bmod P^{(t)} = 0\} | P^{(t)} = p) \mathbb{P}(P^{(t)} = p) \leq \frac{1}{4R}$$

since $k \neq l$, following an argument similar to the previous one. This leaves the case $s = t$, $i-j \neq k-l$. However, thanks to Corollary 2 it follows that the set, $\{s=t\} \cap \{i \neq j\} \cap \{k \neq l\} \cap \{i-j \neq k-l\} \cap \{(i-j) \bmod P^{(t)} = 0\}$ $\cap \{(k-l) \bmod P^{(s)} = 0\}$ must be empty. Putting everything together we find that, $$\mathbb{P}\left(\left\|\left(I - \frac{1}{T}(FB)^*(FB)\right)x\right\|_2 > \frac{1}{2}\right) \leq$$

$$4 \sum_{i \neq j} \sum_{k \neq l} \bar{x}_i x_j x_k \bar{x}_l \frac{1}{T^2} \left[\sum_{s,t=1}^T \left(\mathbb{E}\left[\mathbb{1}_{s \neq t}(s,t) [B^{(t)*} B^{(t)}]_{ij} [B^{(s)*} B^{(s)}]_{kl}\right] + \right.\right.$$

$$\left.\left. \mathbb{E}\left[\mathbb{1}_{s=t}(s,t) \mathbb{1}_{i-j=k-l}(i,j,k,l) [B^{(t)*} B^{(t)}]_{ij} [B^{(s)*} B^{(s)}]_{kl}\right]\right)\right] \leq$$

$$4 \left(\frac{1}{16R^2}\right) \left(\sum_{k \neq l} \bar{x}_l x_k\right)^2 + \frac{4}{T} \left(\frac{1}{4R}\right) \left(\sum_{k \neq l} \bar{x}_l x_k\right) \left(\sum_j \bar{x}_{j+k-l} x_j\right)$$

We further note that $\sum_{i \neq j} x_l x_k$ is a bilinear form bounded by the norm of an $R \times R$ matrix with all entries equal to 1 except the diagonal which is all zeros. It is easy to work out this norm which is equal to $R-1$ so that, $$\frac{1}{R} \sum_{k \neq l} \bar{x}_l x_k < 1$$

Finally, by Cauchy-Schwartz inequality, $$|\Sigma_j x_{j+k-l} x_j| \leq \sqrt{\Sigma_j |x_{j+k-l}|^2} \sqrt{\Sigma_j |x_j|^2} = \|x\|_2^2 = 1.$$

Thus, $$\mathbb{P}\left(\|(I - \frac{1}{T}(FB)^*(FB))x\|_2 > \frac{1}{2}\right) < \frac{1}{4} + \frac{1}{T} \leq \frac{1}{2}$$

as claimed.

Corollary 3. Under the hypotheses of Proposition 6, the solution to the linear system $$FB\hat{f} = f_0$$

takes the form, $$\hat{f} = \sum_{n=0}^{\infty} \left[I - \frac{1}{T}B^*B\right]^n \left(\frac{1}{\sqrt{T}}(FB)^* f_0\right)$$

with probability at least ½.

Proof. By Proposition 6, $$\|I - \frac{1}{T}(FB)^*(FB)\|_2 < \frac{1}{2}$$

with probability at least I/. When this is the case we write, $$FB\hat{f} =$$

$$f_0 \Leftrightarrow \frac{1}{T}B^*B\hat{f} = \frac{1}{\sqrt{T}}B^*F^*f_0 \Leftrightarrow \left[I - \left(I - \frac{1}{T}B^*B\right)\right]\hat{f} = \frac{1}{\sqrt{T}}(FM)^*b = \hat{f}_0$$

In this case, it is easy to verify that the Neumann series, $$\hat{f} = \sum_{n=0}^{\infty} \left[I - \frac{1}{T}B^*B\right]^n \left(\frac{1}{\sqrt{T}}(FB)^* b\right)$$

satisfies this last equation, and that the sum converges exponentially fast.

Proposition 3. Assume the support $\mathcal{S}$ of $\hat{f}$ is known. Then Algorithm 4 outputs an approximation to the nonzero elements of with error bounded by $\eta$ in the $l^2$-norm, with probability greater than or equal to 1 p using 0 ((log(p)+log (q))Rlog$_R$(N)) samples and O ((log(p)+log(q)) Rlog(N)) computational steps.

Proof. By Proposition 6, $$\frac{1}{T}(FB)(FB)^* = I - \mathcal{P} \text{ where } \left\|I - \frac{1}{T}(FB)(FB)^*\right\|_2 = \|\mathcal{P}\|_2 < \frac{1}{2}$$

1/2 with probability larger than I/. Thus, if we consider O(log ½(p)) independent realizations of FB, the probability that at least one of them is such is greater than or equal to (1-p). When this occur, Corollary 3 states that the solution is given by the Neumann series. Furthermore, $$\left\|\hat{f} - \sum_{n=0}^{\lceil \log_{\frac{1}{2}}(\eta) \rceil} \mathcal{P}^n f^\dagger\right\|_2 =$$

-continued $$\left\|\sum_{\lceil \log_{\frac{1}{2}}(\eta) \rceil}^{\infty} \mathcal{P}^n f^\dagger\right\|_2 \leq \sum_{\lceil \log_{\frac{1}{2}}(\eta) \rceil}^{\infty} \|\mathcal{P}\|_2^n \|f^\dagger\|_2 \leq O(\eta)$$

by the geometric series and the bound $$\|\mathcal{P}\|_2 \leq \frac{1}{2}.$$

Lemma 7. Assuming the noise term v is such that $$\|\hat{v}\|_2 < \frac{\eta}{\sqrt{N}},$$

the error term of the computed value in Eq. (12) is uniformly bounded by $$\|\psi_n^{(k)}(Q)\|_\infty =$$

$$\left\|\frac{1}{M_k} \sum_{m \in \mathcal{A}(K,M_k)} e^{2\pi i \frac{nm}{K}} g_\sigma\left(\frac{m}{M_k}\right) v_{(m[Q]_{M_k}^{-1}) \bmod M_k; M_k}\right\|_\infty < O(\eta).$$

Proof First, not that since $\Pi_Q( )$ is an isomorphic permutation operator (for all Q E Q(M$_k$)) one has $$\|\Pi_Q\|_\infty = 1.$$

Similarly, since the filtering operator W,(.) is diagonal with nonzero entries $\hat{g}_\sigma(n)$, then $$\|\Psi_\sigma\|_\infty = \sup_{m \in \{0,1,\ldots,M_k-1\}} \left|\hat{g}_\sigma\left(\frac{m}{M_k}\right)\right| \leq \sqrt{\pi}\sigma = \frac{\sqrt{\pi}\frac{\alpha M_k}{2R}}{\sqrt{\log\left(\frac{2R\Delta}{\delta}\right)}}.$$

Finally, we get from the triangle inequality that, $$\leq \frac{\#\mathcal{A}(K; M_k)}{M_k}\|\Psi_\sigma\|_\infty \|\Pi_Q\|_\infty \|v\|_\infty \leq \frac{\sqrt{\pi}\frac{\alpha K}{R}}{\sqrt{\log\left(\frac{2R\Delta}{\delta}\right)}}\|v\|_\infty \leq \frac{\sqrt{\pi}\frac{\alpha K}{R}}{\sqrt{\log\left(\frac{2R\Delta}{\delta}\right)}}\|\hat{v}\|_1$$

by the Hausdorff-Young inequality. Finally, we note that: $\|\hat{v}\|_1 < \sqrt{N}\|\hat{v}\|_2 < \eta$ by assumption, and recall that $K = \mathcal{O}(R\sqrt{\log(R)})$. This leads to the desired result.

Proposition 4. (Rank-1 d-dimensional DFT) Assume the function $f:[0,1)^d \to \mathbb{C}$ has form (13). Then, $$\int_{[0,1)^d} e^{-2\pi i j \cdot x} f(x) dx = \frac{1}{N} \sum_{n=0}^{N-1} e^{-2\pi i j \cdot x_n} f(x_n) \quad (14)$$

for all $j \in [0, M)^d \cap \mathbb{Z}^d$, where $$x_n = \frac{ng \bmod N}{N}, g = (1, M, M^2, \ldots, M^{d-1})$$

and $N = M^d$.

Proof First, note that $$\int_{[0,1]^d} e^{-2\pi i j \cdot x} f(i) dx = \hat{f}_j.$$

Then, substitute the samples in the quadrature to obtain $$\frac{1}{N}\sum_{n=0}^{N-1} e^{-2\pi i j \cdot x_n} f(x_n) = \frac{1}{N}\sum_{n=0}^{N-1} e^{-2\pi i j \cdot \frac{ng \bmod N}{N}} \left( \sum_{k \in [0,M)^d \cap \mathbb{Z}^d} \hat{f}_k e^{2\pi i k \cdot \frac{ng \bmod N}{N}} \right) =$$

$$\sum_{k \in [0,M)^d \cap \mathbb{Z}^d} \hat{f}_k \left( \frac{1}{N}\sum_{n=0}^{N-1} e^{-2\pi i \frac{n((k-j)\cdot g)}{N}} \right)$$

Since $$e^{2\pi i (k-j) \cdot \frac{ng \bmod N}{N}} = e^{2\pi i (k-j) \cdot \frac{ng}{N}}.$$

Note however that $$\frac{1}{N}\sum_{n=0}^{N-1} e^{-2\pi i \frac{n((k-j)\cdot g)}{N}} = D_N((k-j)\cdot g),$$

which is the Dirichlet kernel and is equal to 0 unless $(k-j)\cdot g = 0 \bmod N$, in which case it is equal to 1. Thus, $$\frac{1}{N}\sum_{n=0}^{N-1} f(x_n) = \hat{f}_j + \sum_{\substack{k \in [0,M)^d \cap \mathbb{Z}^d \\ (k-j)\cdot g \bmod N = 0 \\ (k-j)\cdot g \neq 0}} \hat{f}_k.$$

Thus, in order to show that the quadrature is exact, it suffices to show that the remaining sum on the right-hand side of the previous equation is trivial. To see this, note that $(k-j) \in [-M, M)^d \cap \mathbb{Z}^d$ and consider $$|(k-j)\cdot g| = |(k_1 - j_1) + (k_2 - j_2)M + \ldots + (k_d - j_d)M^{d-1}| \leq M\sum_{l=0}^{d-1} M^l =$$

$$M\frac{1-M^d}{1-M} < M^d = N,$$

where the inequality is strict for any finite M E N strictly larger than 1. This implies that there cannot be any (k j) other than 0 in the domain of interest such that $(k-j)\cdot g \bmod N = 0$. The sum is therefore empty and the result follows.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for identifying magnitudes of frequency components of a signal f(x) received by a receiver, the method comprising:
   obtaining a first plurality of sets of signal samples received by an antenna or a sensor of the receiver, each set comprising a plurality of samples of the signal f(x), a cardinality of each set being greater than an upper bound (R) of a number of non-zero frequency components of the signal f(x) and less than a number of samples N of the signal f(x) according to a Nyquist rate, wherein obtaining each set of signal samples comprises subsampling the signal f(x) by the receiver, at least one set of signal samples determines a support set S; and
   computing by a processor an initial set of frequency coefficients $f_0$ using the support set S and the first plurality of sets of signal samples, the support set S identifying indices of the non-zero frequency components of the signal f(x).

2. The method of claim 1, wherein obtaining the first plurality of sets of signal samples comprises accessing from memory T sets of signal samples, wherein:
   T is on the order of O(1) or on the order of O(R $\log_R$ N); and
   a t-th set of signal samples, wherein index t ranges from 1 through T, comprises $P^{(t)}$ signal samples, $P^{(t)}$ being greater than R and smaller than N.

3. The method of claim 1, wherein obtaining the first plurality of sets of signal samples comprises:
   determining the number of samples (N) of the signal f(x) according to the Nyquist rate, and obtaining the upper bound (R) of the number of non-zero frequency components of the signal;
   selecting a number of sets (T), wherein T is on the order of O(1) or on the order of O(R $\log_R$ N), and selecting T recovery parameters $P^{(t)}$, wherein index t ranges from 1 through T;
   for each recovery parameter $P^{(t)}$, sampling the signal f(x) at $P^{(t)}$ distinct locations, providing the first plurality of T sets of signal samples, each sample set having $P^{(t)}$ samples.

4. The method of claim 1, wherein computing the initial set of frequency coefficients $\hat{f}_0$ comprises multiplying the first plurality of sets of signal samples by: (i) a discrete Fourier transform (DFT) matrix F comprising T DFT submatrices, each submatrix having a size $P^{(t)}$, and index t ranging from 1 through T, and (ii) a binary matrix B based on the support set S.

5. The method of claim 1, further comprising:
   generating a set of frequency coefficients f using a binary matrix B based on the support set S and the initial set of frequency coefficients $f_0$.

6. The method of claim 1, further comprising:
   determining that a norm based on a binary matrix B based on the support set S and the initial set of frequency coefficients $\hat{f}_0$ is not less than a selected threshold;
   obtaining a second plurality of sets of signal samples, each set comprising a plurality of samples of the signal f(x); and
   re-computing the initial set of frequency coefficients fo using the support set S and the second plurality of sets of signal samples.

7. The method of claim 6, further comprising:
   determining that a norm based on the binary matrix B and the re-computed initial set of frequency coefficients $\hat{f}_0$ is less than or equal to the selected threshold; and
   generating a set of frequency coefficients f using the binary matrix B and the re-computed initial set of frequency coefficients $f_0$.

8. A system for identifying magnitudes of frequency components of a signal f(x) received by a receiver, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
   obtain a first plurality of sets of signal samples received by an antenna or a sensor of the receiver, each set comprising a plurality of samples of the signal f(x), cardinality of each set being greater than an upper bound (R) of a number of non-zero frequency components of the signal f(x) and less than a number of samples N of the signal f(x) according to a Nyquist rate, wherein to obtain each set of signal samples the processing unit is configured to subsample the signal f(x) by the receiver, at least one set of signal samples determines a support set S; and compute an initial set of frequency coefficients $f_0$ using a support set S and the first plurality of sets of signal samples, the support set S identifying indices of the non-zero frequency components of the signal f(x).

9. The system of claim 8, wherein to obtain the first plurality of sets of signal samples the processing unit is configured to access from the memory module T sets of signal samples, wherein:

T is on the order of O(1) or on the order of $O(R \log_R N)$; and a t-th set of signal samples, wherein index t ranges from 1 through T, comprises $P^{(t)}$ signal samples, $P^{(t)}$ being greater than R and smaller than N.

10. The system of claim 8, wherein to obtain the first plurality of sets of signal samples the processing unit is configured to:

determine the number of samples (N) of the signal f(x) according to the Nyquist rate, and obtain the upper bound (R) of the number of non-zero frequency components of the signal;

select a number of sets (T), wherein T is on the order of 0 (I) or on the order of 0 $(R \log_R N)$, and select T recovery parameters $P^{(t)}$, wherein index t ranges from 1 through T;

for each recovery parameter $P^{(t)}$, configure a signal sampler to sample the signal f(x) at $P^{(t)}$ distinct locations, providing the first plurality of T sets of signal samples, each sample set having $P^{(t)}$ samples.

11. The system of claim 8, wherein to compute the initial set of frequency coefficients $f_0$ the processing unit is programmed to:

multiply the first plurality of sets of signal samples by: (i) a discrete Fourier transform (DFT) matrix F comprising T DFT submatrices, each submatrix having a size $P^{(t)}$, and index t ranging from 1 through T, and (ii) a binary matrix B based on the support set S.

12. The system of claim 8, wherein the instructions further program the processing unit to:

generate a set of frequency coefficients $\hat{f}$ using a binary matrix B based on the support set S and the initial set of frequency coefficients h.

13. The system of claim 8, wherein the instructions further program the processing unit to:

determine that a norm based on a binary matrix B based on the support set S and the initial set of frequency coefficients $f_0$ is not less than a selected threshold;

obtain a second plurality of sets of signal samples, each set comprising a plurality of samples of the signal f(x); and re-compute the initial set of frequency coefficients $f_0$ using the support set S and the second plurality of sets of signal samples.

14. The system of claim 13, wherein the instructions further program the processing unit to:

determine that a norm based on the binary matrix B and the re-computed initial set of frequency coefficients $\hat{f}_0$ is less than or equal to the selected threshold; and generate a set of frequency coefficients $\hat{f}$ using the binary matrix B and the re computed initial set of frequency coefficients $\hat{f}_0$.

* * * * *